US011216330B2

(12) United States Patent
Channappagoudar et al.

(10) Patent No.: US 11,216,330 B2
(45) Date of Patent: Jan. 4, 2022

(54) METHODS AND SYSTEMS FOR MANAGING AN ELECTRONIC DEVICE

(71) Applicant: SAMSUNG ELECTRONICS CO., LTD., Suwon-si (KR)

(72) Inventors: Manjunath Channappagoudar, Bangalore (IN); Senthil Kumar Iyyappan, Bangalore (IN); Anuradha Kanukotla, Bangalore (IN); Kumar Abhisek, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 16/552,455

(22) Filed: Aug. 27, 2019

(65) Prior Publication Data
US 2020/0065184 A1 Feb. 27, 2020

(30) Foreign Application Priority Data

Aug. 27, 2018 (IN) .............................. 201841032060

(51) Int. Cl.
*G06F 11/07* (2006.01)
*G06N 7/00* (2006.01)
*G06N 20/00* (2019.01)

(52) U.S. Cl.
CPC ........ *G06F 11/0793* (2013.01); *G06F 11/079* (2013.01); *G06F 11/0751* (2013.01); *G06N 7/005* (2013.01); *G06N 20/00* (2019.01)

(58) Field of Classification Search
CPC ............. G06F 11/3438; G06F 11/3062; G06F 11/3612; G06F 11/3447; G06F 11/0793; G06F 11/3409

See application file for complete search history.

(56) References Cited

U.S. PATENT DOCUMENTS 7,076,616 B2 7/2006 Nguyen et al.
7,574,661 B2 8/2009 Matsuura et al.
(Continued)

FOREIGN PATENT DOCUMENTS

KR 10-2016-0058117 A 5/2016
WO 2004077291 A1 9/2004
(Continued)

OTHER PUBLICATIONS

International Search Report and Written Opinion dated Dec. 9, 2019 issued by the International Searching Authority in International Application No. PCT/KR2019/010854 (PCT/ISA/220, PCT/ISA/210, and PCT/ISA/237).
(Continued)

*Primary Examiner* — Nadeem Iqbal
(74) *Attorney, Agent, or Firm* — Sughrue Mion, PLLC

(57) ABSTRACT

Provided are a method and apparatus for controlling an unresponsive state of an electronic device. The method includes: obtaining a plurality of device parameters related to at least one of a hardware module and a software module of the electronic device, and a user usage pattern parameter based on receiving at least one user input to the electronic device; predicting the unresponsive state of the electronic device based on the collected plurality of device parameters and the collected user usage pattern parameter; and avoiding the predicted unresponsive state of the electronic device by applying a policy selected from among a plurality of policies associated with the plurality of the device parameters to a device parameter related to the predicted unresponsive state of the electronic device.

20 Claims, 27 Drawing Sheets

(56) References Cited

U.S. PATENT DOCUMENTS

| | | |
|---|---|---|
| 9,306,828 B2 * | 4/2016 | Fahimi .................. H04L 43/103 |
| 2005/0262394 A1 | 11/2005 | Yasukawa et al. |
| 2008/0005695 A1 | 1/2008 | Ozzie et al. |
| 2008/0005736 A1 | 1/2008 | Apacible et al. |
| 2008/0077358 A1 | 3/2008 | Marvasti |
| 2009/0036102 A1 | 2/2009 | Ho |
| 2011/0131318 A1 | 6/2011 | Maes |
| 2012/0324481 A1 | 12/2012 | Xia et al. |
| 2013/0173513 A1 | 7/2013 | Chu et al. |
| 2014/0089243 A1 * | 3/2014 | Oppenheimer ......... G06F 21/88 706/46 |
| 2014/0359197 A1 | 12/2014 | Franceschini et al. |
| 2014/0372356 A1 | 12/2014 | Bilal et al. |
| 2015/0058265 A1 | 2/2015 | Padala et al. |
| 2015/0134572 A1 | 5/2015 | Forlines et al. |
| 2015/0193325 A1 * | 7/2015 | Harsan-Farr ........ G06F 11/3409 702/186 |
| 2015/0242047 A1 | 8/2015 | Zafiris |
| 2016/0019460 A1 | 1/2016 | Li |
| 2018/0087790 A1 * | 3/2018 | Perez ....................... F24F 11/56 |

FOREIGN PATENT DOCUMENTS

| | | | |
|---|---|---|---|
| WO | 2015/042292 A1 | 3/2015 | |
| WO | 2018/119568 A1 | 7/2018 | |

OTHER PUBLICATIONS

Tingxin Yan et al. "Fast App Launching for Mobile Devices Using Predictive User Context" Mobisys, vol. 12, Jun. 25-29, 2012, (14 pages total).

Yavuz Koroglu et al., "QBE: QLearning-Based Exploration of Android Applications", 2018 IEEE 11th International Conference on Software Testing, Verification and Validation, Apr. 2018, 11 pages total, XP033351432.

Shie Mannor et al., "Dynamic Abstraction in Reinforcement Learning via Clustering", Proceedings of the 21st International Conference on Machine Learning, Jul. 2004, 8 pages total, XP058138646.

Zhao Jin et al., "A State-Cluster based Q-learning", 2009 Fifth International Conference on Natural Computation, IEEE, Aug. 2009, 6 pages total, XP031587363.

Communication dated Jul. 30, 2021 issued by the European Intellectual Property Office in counterpart European Application No. 19856201.9.

* cited by examiner

FIG. 9A

| Type | Number of elements | Details |
|---|---|---|
| Application | 10 | Package Name, frame drop, touch time, foreground, power use mode, ultra power save mode, emergency mode Knox mode, SIOP, and CPU frequency |
| Thermal | 6 | CPU temperature, power core temperature, Performance core temperature, modem temperature, CP traffic and Wi-Fi traffic |
| Kernel Memory | 10 | Memory free, Memory cache, memory buffered, ratio of background memory to foreground memory, memory active anon, inactive anon, active file, inactive file, swap free and memory mapped |
| Platform memory | 14 | Visible PSS, persistent PSS, foreground PSS, native PSS |

FIG. 9B

| Category | Number Parameter | Details |
|---|---|---|
| Notification Parameters | 11 | Number of pending notification, number of new notifications during app launch. |
| Configuration Parameter | 12 | Last configuration (orientation) change time in the system. Number of configuration change. |
| Usage Parameters | 9 | Package installation is in progress or not (1,0), last charger connected time, time when wifi was turned on, time duration between screen off and app launch, pending Intents count, is disk full, sync in progress, number of application installed in the system, number of cached applications. |

FIG. 9C

| Metric | Description |
|---|---|
| PSS memory | Proportional Set Size is the portion of memory occupied by the running process by proportionally considering the shared memory; increase in this PSS memory occupied, reduces the amount of free memory available. This may lead to Sluggishness. |
| CPU temperature | Increase in temperature will lead to clock gating (reduction of clock frequency to reduce the temperature) which leads to slow execution speed causing sluggishness to the user. |
| Number of Notifications Received | Notifications received in the system will heavily use the network to receive the notification and or system's resources like CPU to draw the notification in the notification bar and to sort the notifications which are already available in the system. This kind of heavy system usage may lead to Sluggishness. |
| Number of Configuration change | When the number of orientation change or increasing in the system, such configuration change is broadcasted to all the applications in the system which can lead to sluggishness. |
| Number of Pending Intents | Increasing in pending intents indicates increase in the number of notifications in the system, which can cause sluggishness. |

| Action | Policy | Actions Performed |
|---|---|---|
| Action A0 | Memory Policy | Trigger cleaning of garbage collection |
| Action A1 | Memory Policy | trim memory |
| Action A2 | Memory Policy | control background applications, services and cached applications |
| Action A3 | Configuration change policy | Defer configuration change for empty applications |
| Action A4 | Configuration change policy | Defer configuration change for empty applications, services |
| Action A5 | Configuration change policy | For empty applications, services and content providers |
| Action A6 | Notification change policy | Defer ranking (sorting of modifications) |
| Action A7 | Notification change policy | Defer modification draw in the modification drawer |

FIG. 10B

| | | | Policy |
|---|---|---|---|
| Configuration change policy | 0 | 5 | As configuration change (orientation) is not happening during the social network application launch, configuration policy got negative remark. |
| Notification change policy | 8 | 6 | Applying notification change policy reduced touch latency so it got positive remark. |

| | Touch response time |
|---|---|
| After applying the notification change policy | 700 ms |
| Without applying the notification change policy (conventional approaches) | 1100 ms |

FIG. 10C

| Policy type | Number of crashes | Number of freezes | Notes |
|---|---|---|---|
| Configuration change policy | 0 | 5 | As configuration change (orientation) is not happened during the launch so configuration policy got negative rewards |
| Notification change policy | 0 | 4 | Applying notification policy did not reduce Sluggishness |
| Memory policy | 9 | 7 | Application of memory policy frees more available memory for display drivers to avoid frame drop |

| | Frame rate |
|---|---|
| After applying the memory policy | 65 |
| Without applying the memory policy (conventional approaches) | 54 |

FIG. 11A

| Application Name | Base Launch Time | With Notification change Policy | % Gain |
|---|---|---|---|
| Camera application | 765 | 531 | 30 |
| Gallery application | 359 | 260 | 27 |
| Gaming application | 1436 | 1112 | 23 |

FIG. 11B

| Application Name | Base | Configuration change policy | % change |
|---|---|---|---|
| Gaming application-A | 1569 | 1460 | 7% |
| Gaming application-B | 1344 | 1202 | 11% |
| Gaming application-C | 1662 | 1477 | 11% |
| Gaming application-D | 1294 | 1078 | 16% |
| Gaming application-E | 1388 | 1282 | 8% |
| Gaming application-F | 1669 | 1509 | 10% |
| Camera application | 1181 | 1101 | 7% |

FIG. 11C

| Camera application | Base | Configuration Change policy | % change |
|---|---|---|---|
| portrait to Landscape | 345 | 287 | 17% |
| Landscape to portrait | 311 | 290 | 7% |

METHODS AND SYSTEMS FOR MANAGING AN ELECTRONIC DEVICE

CROSS REFERENCE TO RELATED APPLICATION(S)

This application is based on and claims priority under 35 U.S.C. § 119 to Indian Provisional Application No. 201841032060, filed on Aug. 27, 2018, and Indian Application No. 201841032060, filed on Jul. 23, 2019, in the Indian Patent Office, the disclosures of which are incorporated by reference herein in their entireties.

BACKGROUND

1. Field

The disclosure relates to the field of managing electronic devices and more particularly to predicting and avoiding sluggishness of electronic devices.

2. Description of Related Art

Sluggishness is an unresponsive state of an electronic device/system and applications. For example, the sluggishness may occur when an application launch time, a frame drop, and a touch latency exceed a pre-defined threshold.

In related art approaches, the sluggishness may be predicted using a mathematical model and a plurality of data parameters related to at least one hardware module and software of the electronic device. Prediction accuracy of the sluggishness depends on a number of data parameters that are analyzed for the prediction of the sluggishness. It is assumed that, the greater the number of data parameters, the more accurate the mathematical model is for predicting the sluggishness of the electronic devices. However, turbulence or variances in any of the included data parameters and the extraneous nature of the data may curtail the prediction accuracy.

In related art approaches, the sluggishness can be reduced using software policies such as, but not limited to, resource management, background app management, LMK (Low Memory Killer), Governor, Scheduler, and so on. The software policies are mainly targeted at system parameters like Central Processing Unit (CPU) frequency, thermal, scheduler, low memory, and so on for reducing the sluggishness. However, such software policies can be triggered only after the occurrence of sluggishness. The existing software policies do not prevent the electronic devices from entering or re-entering abnormal system states.

SUMMARY

Provided are methods and apparatus for controlling an unresponsive state of an electronic device.

Additional aspects will be set forth in part in the description which follows and, in part, will be apparent from the description, or may be learned by practice of the presented embodiments.

In accordance with an aspect of the disclosure, a method for controlling an unresponsive state of an electronic device includes: obtaining, by a processor of the electronic device, a plurality of device parameters related to at least one of a hardware module of the electronic device and a software module of the electronic device, and a user usage pattern parameter based on receiving a user input to the electronic device; predicting, by the processor, the unresponsive state of the electronic device based on the obtained plurality of device parameters and the obtained user usage pattern parameter; and avoiding, by the processor, the predicted unresponsive state by applying, to a device parameter related to the predicted unresponsive state from among the plurality of device parameters, a policy determined from among a plurality of policies.

The predicting may include: determining an unresponsive state parameter, from among the obtained plurality of device parameters and the obtained user usage pattern parameter, based on a cause-effect relation between the plurality of device parameters and the user usage pattern parameter, wherein the unresponsive state parameter causes the unresponsive state; clustering the determined unresponsive state parameter using a four-dimensional (4D) clustering model; and predicting a source of the unresponsive state of the electronic device using the clustered unresponsive state parameter.

The determining the unresponsive state parameter may include: generating a Direct Acyclic Graph (DAG) by performing a causal structure analysis (CSA) on the obtained plurality of device parameters and the obtained user usage pattern parameter, wherein the DAG includes a plurality of nodes representing an unresponsive state node and at least one of the plurality of device parameters and the user usage pattern parameter; determining the unresponsive state node related to the unresponsive state of the electronic device using the cause-effect relation identified by analyzing the plurality of nodes of the DAG and an edge associated with the plurality of nodes of the DAG; and determining a parameter represented by a node connected to the determined unresponsive state node as the unresponsive state parameter.

The clustering the determined unresponsive state parameter may include: determining a predetermined number of center points; classifying the determined unresponsive state parameter on a 4D map, based on the determined predetermined number of center points; and forming a cluster in which the unresponsive state parameter is included, based on a pre-set mean value of cluster for each of the predetermined number of center points.

The predicting the source of the unresponsive state of the electronic device may include: identifying whether the formed cluster is an unresponsive state cluster representing an unresponsive state condition; predicting a responsive state of the electronic device based on not identifying that the clustered unresponsive state parameter is classified as the unresponsive state cluster; and predicting the unresponsive state of the electronic device based on identifying that the clustered unresponsive state parameter is classified as the unresponsive state cluster.

The avoiding, by the processor, the predicted unresponsive state may include: determining a policy, from among the plurality of policies associated with the predicted unresponsive state, based on rewards previously set to each of the plurality of policies; determining, based on the user usage pattern parameter, an action among a plurality of actions corresponding to the determined policy; and applying the determined action to the device parameter that is related to the predicted unresponsive state.

The plurality of policies may include at least one of a configuration change policy, a notification policy, and a memory policy; and the device parameter related to the predicted unresponsive state may be determined based on exceeding a pre-defined threshold.

The method may further include assigning, by the processor, the rewards to the determined policy based on a number of unresponsive state occurrences during a predetermined period of time after applying the determined action to the device parameter related to the predicted unresponsive state.

The assigning the rewards may include: assigning, by the processor, a positive reward to the determined policy based on a decrease in the number of unresponsive state occurrences during the predetermined period of the time; and assigning, by the processor, a negative reward to the determined policy based on an increase in the number of unresponsive state occurrences during the predetermined period of the time.

The determining the policy from among the plurality of policies associated with the predicted unresponsive state may include selecting, by the processor, the policy in a dynamic sequence to maximize rewards based on the user usage pattern parameter.

In accordance with an aspect of the disclosure, an electronic device includes: a memory storing instructions; and at least one processor configured to execute the instructions to: obtain a plurality of device parameters related to at least one of a hardware module of the electronic device and a software module of the electronic device, and a user usage pattern parameter based on receiving a user input to the electronic device; predict an unresponsive state of the electronic device based on the obtained plurality of device parameters and the obtained user usage pattern parameter; and avoid the predicted unresponsive state by applying, to a device parameter related to the predicted unresponsive state from among the plurality of device parameters, a policy determined from among a plurality of policies.

The at least one processor may be further configured to execute the instructions to: determine an unresponsive state parameter, from among the obtained plurality of device parameters and the obtained user usage pattern parameter, based on a cause-effect relation between the plurality of device parameters and the user usage pattern parameter, wherein the unresponsive state parameter causes the unresponsive state; cluster the determined unresponsive state parameter using a 4D clustering model; and predict a source of the unresponsive state of the electronic device using the clustered unresponsive state parameter.

The at least one processor may be further configured to execute the instructions to: generate a Direct Acyclic Graph (DAG) by performing a causal structure analysis (CSA) on the obtained plurality of device parameters and the obtained user usage pattern parameter, wherein the DAG may include a plurality of nodes representing an unresponsive state node and at least one of the plurality of device parameters and the user usage pattern; determine the unresponsive state node related to the unresponsive state of the electronic device using the cause-effect relation identified by analyzing the plurality of nodes of the DAG and an edge associated with the plurality of nodes of the DAG; and determine a parameter represented by a connected to the determined the unresponsive state node as the unresponsive state parameter.

The at least one processor may be further configured to execute the instructions to: determine a predetermined number of center points; classify the determined unresponsive state parameter on a 4D map, based on the determined predetermined number of center points; and form a cluster in which the unresponsive state parameter is included, based on a pre-set average value of cluster for each of the predetermined number of center points.

The at least one processor may be further configured to execute the instructions to: identify whether the formed cluster is an unresponsive state cluster representing an unresponsive state condition; predict a responsive state of the electronic device based on not identifying that the clustered unresponsive state parameter is classified as the unresponsive state cluster; and predict the unresponsive state of the electronic device based on identifying that the clustered unresponsive state parameter is classified as the unresponsive state cluster.

The at least one processor may be further configured to execute the instructions to: determine a policy, from among the plurality of policies associated with the predicted unresponsive state, based on rewards previously set to each of the plurality of policies; determine, based on the user usage pattern parameter, an action among a plurality of actions corresponding to the determined policy; and apply the determined action to the device parameter that is related to the predicted unresponsive state.

The plurality of policies may include at least one of a configuration change policy, a notification policy, and a memory policy; and the device parameter related to the predicted unresponsive state may be determined based on exceeding a pre-defined threshold.

The at least one processor may be further configured to execute the instructions to assign the rewards to the determined policy based on a number of unresponsive state occurrences during a predetermined period of time after applying the determined action to the device parameter related to the predicted unresponsive state.

The at least one processor may be further configured to execute the instructions to: assign a positive reward to the determined policy based on a decrease in the number of unresponsive state occurrences during the predetermined period of the time; and assign a negative reward to the determined policy based on an increase in the number of unresponsive state occurrences during the predetermined period of the time.

In accordance with an aspect of the disclosure, a method for avoiding an unresponsive state of an electronic device includes: obtaining, by a processor of the electronic device, a device parameter based on receiving a user input to the electronic device; predicting, by the processor, the unresponsive state of the electronic device based on the obtained device parameter; and avoiding, by the processor, entering the predicted unresponsive state by applying a policy, determined from among a plurality of policies, to the device parameter.

The predicting may include: determining the device parameter, from among a plurality of device parameters obtained based on receiving the user input, as an unresponsive state parameter, according to a cause-effect relation between the plurality of device parameters and a user usage pattern parameter obtained based on the user input; clustering the determined unresponsive state parameter using a four-dimensional (4D) clustering model; and predicting a source of the unresponsive state using the clustered unresponsive state parameter.

The determining the unresponsive state parameter may include: generating a Direct Acyclic Graph (DAG) by performing a causal structure analysis (CSA) on the obtained plurality of device parameters and the obtained user usage pattern parameter, wherein the DAG may include a plurality of nodes representing an unresponsive state node and at least one of the plurality of device parameters and the user usage pattern parameter; determining the unresponsive state node related to the unresponsive state of the electronic device using the cause-effect relation identified by analyzing the plurality of nodes of the DAG and an edge associated with the plurality of nodes of the DAG; and determining a parameter represented by a node connected to the determined unresponsive state node as the unresponsive state parameter.

The avoiding, by the processor, entering the predicted unresponsive state may include: determining a policy, from among the plurality of policies associated with the predicted unresponsive state, based on rewards previously set to each of the plurality of policies; determining, based on a user usage pattern parameter obtained according to the received user input, an action among a plurality of actions corresponding to the determined policy; and applying the determined action to the device parameter that is related to the predicted unresponsive state.

The plurality of policies may include at least one of a configuration change policy, a notification policy, and a memory policy; and the device parameter related to the predicted unresponsive state may be determined based on exceeding a pre-defined threshold.

In accordance with an aspect of the disclosure, a non-transitory computer-readable recording medium has recorded thereon a program executable by at least one processor for performing the method for avoiding the unresponsive state of an electronic device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9A is an example table illustrating device parameters that are collected for predicting an unresponsive state of an electronic device, according to an embodiment;

FIG. 9B is an example table illustrating user usage pattern parameters that are collected for predicting an unresponsive state of an electronic device, according to an embodiment;

FIG. 9C is an example table illustrating unresponsive state parameters that are responsible for causing an unresponsive state of an electronic device, according to an embodiment;

FIG. 9D is an example table illustrating a source of an unresponsive state of an electronic device based on a cluster identified for unresponsive state parameters and a policy selected for avoiding the predicted unresponsive state of the electronic device, according to an embodiment;

FIG. 9E is an example table illustrating actions of at least one policy that can be used for reducing an unresponsive state of an electronic device, according to an embodiment;

FIG. 10B is an example diagram illustrating selection of at least one policy for various kind of applications, according to an embodiment;

FIG. 10C is an example diagram illustrating selection of at least one policy for various kinds of applications, according to an embodiment;

FIG. 11A is an example table illustrating a reduced launch time of various applications based on selecting a notification change policy for various applications, according to an embodiment;

FIG. 11B is an example table illustrating a reduced launch time of various applications based on selecting a configuration change policy for the various applications, according to an embodiment;

FIG. 11C is an example table illustrating decreased camera rotation time based on selecting a configuration change policy, according to an embodiment;

DETAILED DESCRIPTION

Figure 1:
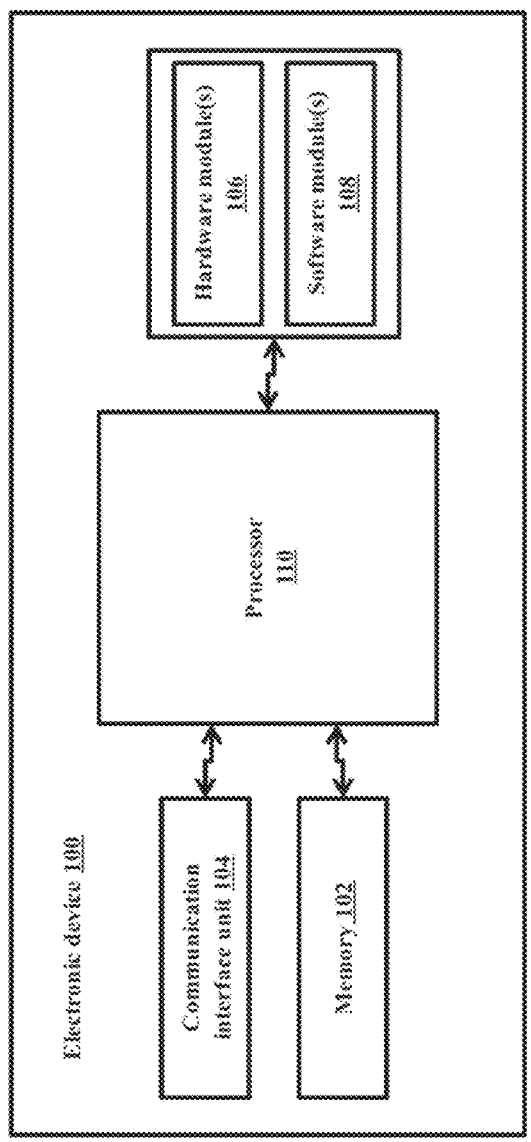
FIG. 1 is a block diagram of an electronic device for controlling an unresponsive state of the electronic device, according to an embodiment.

The embodiments herein and the various features and advantageous details thereof are explained more fully with reference to non-limiting embodiments that are illustrated in the accompanying drawings and detailed in the following description. Descriptions of well-known components and processing techniques may be omitted so as to not unnecessarily obscure the embodiments herein. The description herein is intended merely to facilitate an understanding of ways in which embodiments herein can be practiced and to further enable those of skill in the art to practice the embodiments herein. Accordingly, this disclosure should not be construed as limiting the scope of the embodiments herein.

Embodiments herein disclose methods and systems for predicting and reducing sluggishness of an electronic device. Referring now to the drawings, and more particularly to FIGS. 1-4, 5A-5C, 6, 7A-7B, 8A-8B, 9A-9F, 10A-10C, 11A-11E, and 12, where similar reference characters denote corresponding features consistently throughout the figures, embodiments will now be described.

FIG. 1 is a block diagram of an electronic device 100 for controlling an unresponsive state of the electronic device 100, according to an embodiment. The electronic device 100 referred herein can be any digital device including multiple functionalities, services and information. Examples of the electronic device 100 include, but are not limited to, a mobile phone, a smart phone, a tablet, a personal digital assistant (PDA), a laptop, an electronic reader, an Internet of Things (IoT) device, a wearable computing device, a medical device, a gaming device, a smart watch, a camera, a television (TV), a washing machine, a refrigerator, a vehicle infotainment system, etc. The multiple functionalities, services and information can be at least one of applications, settings/configurations, personal information, messages, photos and so on. Examples of the applications include, but are not limited to, a calendar application, a navigation application, a messaging application, a gaming application, a health and fitness application, a weather application, a camera application, a web browser, a video streaming application, a payment application, a financial application, an education application, a news application, a shopping application, a utility application, etc.

The electronic device 100 may be further connected to a server and external databases using a communication network for accessing the multiple functionalities, services and information. Examples of the communication network include, but are not limited to, the Internet, a wired network (e.g., a Local Area Network (LAN), Ethernet, etc.), a wireless network (e.g., a Wi-Fi network, a cellular network, a Wi-Fi Hotspot, Bluetooth, Zigbee, Z-wave, etc.), etc. In one or more other embodiments, the electronic device 100 can be connected to a cloud platform through a gateway.

The electronic device 100 includes a memory 102, a communication interface unit 104 (e.g., communication interface), at least one hardware module 106, at least one software module 108, and a processor 110 (or at least one processor).

The memory 102 may store programs for processing and controlling the processor 110 and may store data input to or output from the electronic device 100. Also, the memory 102 can be configured to store the multiple functionalities, the applications, the services, the information, operating conditions/parameters of the at least one hardware module 106 and the at least one software module 108, at least one user usage pattern parameter related to at least one user usage pattern, policies, rewards associated with policies, and so on. The memory 102 may include one or more computer-readable storage media. The memory 102 may include at least one of a flash memory type, a hard disk type, a multimedia card micro type, a card type memory (e.g., SD or XD memory), Random Access Memory (RAM), Static Random Access Memory (SRAM), Read Only Memory (ROM), Electrically Erasable Programmable Read-Only Memory (EEPROM), Programmable Read-Only Memory (PROM), a magnetic memory, a magnetic disk, an optical disk, etc. In addition, the memory 102 may, in some examples, be considered a non-transitory storage medium. The term "non-transitory" may indicate that the storage medium is not embodied in a carrier wave or a propagated signal. However, the term "non-transitory" should not be interpreted to mean that the memory 102 is non-movable. In some examples, the memory 102 can be configured to store larger amounts of information than the memory's technical capacity. In certain examples, a non-transitory storage medium may store data that can, over time, change (e.g., in RAM or cache).

The communication interface unit 104 can be configured to establish communication between the electronic device 100 and external entities (e.g., a server, external databases, an external electronic device and so on) using the communication network.

For example, the communication interface unit 104 may include a short-range wireless communication interface, a mobile communication interface, and a broadcast receiver. The short-range wireless communication interface may include a Bluetooth communication interface, a Bluetooth low energy (BLE) communication interface, a near field communication interface, a WLAN communication interface, a WLAN (WiFi) communication interface, a Zigbee communication interface, an infrared data association (IrDA) communication interface, a Wi-Fi direct (WFD) communication interface, an ultra wideband (UWB) communication interface, an Ant+ communication interface, a Z-wave communication interface, etc., but is not limited thereto.

The at least one hardware module 106 can include at least one of sensors (a microphone, a camera, an optical sensor, a user's gazing sensor, a proximity sensor or any other sensor embedded within the electronic device 100), a display (e.g., to provide a Graphical User Interface (GUI) screen/window as an interface to a user for interacting with the electronic device 100), a battery, a power management module (for managing the battery), a key guard and so on. The at least one hardware module 106 can also include the memory 102.

The at least one software module 106 can be configured to prepare contents (that act as links to the multiple functionalities, the applications, the services, the information, the notifications, and so on present in the electronic device 100) to be displayed to the user. Examples of the at least one software module include, but are not limited to, a wallpaper application module, an application launcher module, a status bar application module, a notification drawer module, and so on.

The processor 110 can be at least one of a single processor, a plurality of processors, multiple homogenous cores, multiple heterogeneous cores, multiple Central Processing Units (CPUs) of different kinds, and so on.

The processor 110 can be configured to continuously monitor one or more user activities performed using the electronic device 100 and receive at least one user input to the electronic device 100 in response to detecting the one or more user activities. Examples of the user activities include, but are not limited to, launching/installing of the application(s), interacting with the application(s), performing gestures (such as tap, swipe, drag, scroll, and so on) on the display (touch events) to access the multiple functionalities, the services and the information, accessing the contents/notifications present on the display/stored in the memory 102, etc.

The processor 110 can communicate with the at least one hardware module 106 and the at least one software module 108 to collect (e.g., obtain, determine, identify, etc.) information about operating parameters/conditions of the at least one hardware module 106 and/or the at least one software module 108 related to every user activity. The operating parameters may include a plurality of device parameters related to at least one of the at least one hardware module 106 and the at least one software module 108, and a plurality of user usage pattern parameters in response to receiving at least one user input to the electronic device 100. According to an embodiment, the operating parameters of the at least one hardware module 106 and the at least one software module 108 can be at least one of application-related parameters, thermal-related parameters, memory-related parameters, etc. Examples of the application related parameters include, but are not limited to, a launch time of the at least one application, a frame drop, package names associated with the at least one application, a mode of the at least one application (e.g., a power save mode, an ultra power save mode, an emergency mode, a knox mode, and so on), Central Processing Unit (CPU) frequency, etc. Examples of the thermal-related parameters include, but are not limited to, a temperature of a Graphical Processing Unit (GPU) associated with the processor 110, power core temperature, performance core temperature, modem temperature, processing (CP) traffic, Wireless-Fidelity (Wi-Fi) traffic, etcc. Examples of the memory-related parameters include, but are not limited to, available memory space, information about memory cache and memory buffer, a ratio of a background memory to a foreground memory, a memory active anon, an inactive anon, an active file, an inactive file, swap free and memory mapped information, a visible proportional set size (PSS) (portion of the memory 102), a persistent PSS, a foreground PSS, a native PSS, etc. As used herein, terms such as "operating parameters," "operating conditions," "device parameters," "system parameters," and so on refer to parameters related to the at least one hardware module 106 and/or the at least one software module 108.

The processor 110 can also collect (e.g., obtain) the user usage patterns for a period of time by communicating with the at least one of the hardware module 106 and/or the at least one software module 108 and acquire user usage pattern parameter from the collected user usage patterns. The user usage patterns can be at least one of notification access patterns, configuration change patterns, unique patterns and so on. Examples of the notification access patterns include, but are not limited to, reactions of the user with respect to pending notifications and new notifications (e.g., clearing the notifications immediately after reading (e.g., within a predetermined time from the display of the notification), rarely clearing the notifications, and so on), notification access time, etc. Examples of the configuration change patterns include, but are not limited to, a number of configuration changes of the at least one hardware module 106 (for example, orientation of the camera) and the at least one software module 108 performed by the user, last configuration change time, etc. Examples of the unique parameters include, but are not limited to, information about how frequently the user charges the electronic device 100, a last charging time, time when the Wi-Fi is turned ON by the user, duration between turning ON and turning OFF (by the user) a screen of the display, duration between the screen OFF and a launch of the at least one application, a number of applications installed by the user, a number of cached applications, pending intents count, information about whether any package installation started by the user is in progress or not, etc.

Based on the collected device parameters and the user usage pattern parameter, the processor 110 predicts the sluggishness of the electronic device 100. In other words, the processor 100 may predict an unresponsive state of the electronic device 100 based on the collected device parameters and the user usage pattern parameter. The sluggishness referred herein can be an unresponsive state of the electronic device 100. According to an embodiment, the unresponsive state of the electronic device 100 may include a state of the electronic device 100 in which the launch time of the application executed in the electronic device 100 exceeds a preset threshold value. According to an embodiment, the unresponsive state of the electronic device 100 may include a state of the electronic device 100 in which the frame of the image output from the electronic device 100 (e.g., frame rate) decreases below a predetermined threshold value. According to an embodiment, the unresponsive state of the electronic device 100 may represent a state of the electronic device 100 whose touch latency for the user's touch input to the electronic device 100 exceeds a preset threshold. According an embodiment, the unresponsive state may refer to a state in which the speed of an application executed by the electronic device 100 is reduced, e.g., below a preset threshold. The processor 110 can consider the device 100 to be sluggish if a response time of the at least one hardware module 106 and/or the at least one software module 108 to the one or more user activities and the associated device parameters exceed a pre-defined threshold. The threshold time can be pre-defined based on at least one factor associated with the electronic device 100. The at least one factor can be at least one of a type of the electronic device 100, specifications/functionalities supported by the electronic device 100, an operating environment associated with the electronic device 100 etc. For example, the electronic device 100 can be determined to be in an unresponsive state, when the launch time of the at least one application exceeds the pre-defined threshold, when the frame drop exceeds the pre-defined threshold, when touch latency exceeds the pre-defined threshold, or the like. As used herein, terms such as "sluggishness," "State of Entering System Sluggishness (SESS)," and so on interchangeably refer to the unresponsive state of the electronic device 100 or the applications present in the electronic device 100.

In an embodiment, the processor 110 predicts the unresponsive state of the electronic device 100 by determining at least one device parameter and/or at least one user usage pattern as a cause for the unresponsive state. In an embodiment, the processor 110 determines the at least one device parameter and/or at least one user usage pattern causing the unresponsive state of the electronic device 100 using a cause-effect relation identified among the collected device parameters and the user usage patterns using a four-dimensional (4D) clustering model.

Once the device 100 has been in the unresponsive state, the processor 110 reduces the unresponsive state by configuring at least one policy/change policy. Examples of the policy include, but are not limited to, a configuration change policy, a notification policy/notification change policy, a memory policy, etc. The processor 110 can apply the at least one policy to the at least one device parameter that is a cause for the unresponsive state (wherein the device parameter exceeds the pre-defined threshold), so that for a future user activity, the device parameters of the at least one hardware module 106 and/or the at least one software module 108 and the associated response time may not exceed the pre-defined threshold and the device 100 may not enter the unresponsive state due this specific parameter.

In an embodiment, the processor 110 may configure the at least one policy based on rewards associated with previously applied policies. As a result, the user experience while interacting with the electronic device 100 is enhanced.

FIG. 1 shows an exemplary block diagram of the electronic device 100, but it is to be understood that other embodiments are not limited thereto. In other embodiments, the electronic device 100 may include less or more number of units or components. Further, the labels or names of the units or components are used only for illustrative purpose and does not limit the scope of the embodiments herein. One or more units can be combined together to perform the same or substantially similar function in the electronic device 100.

Figure 2:
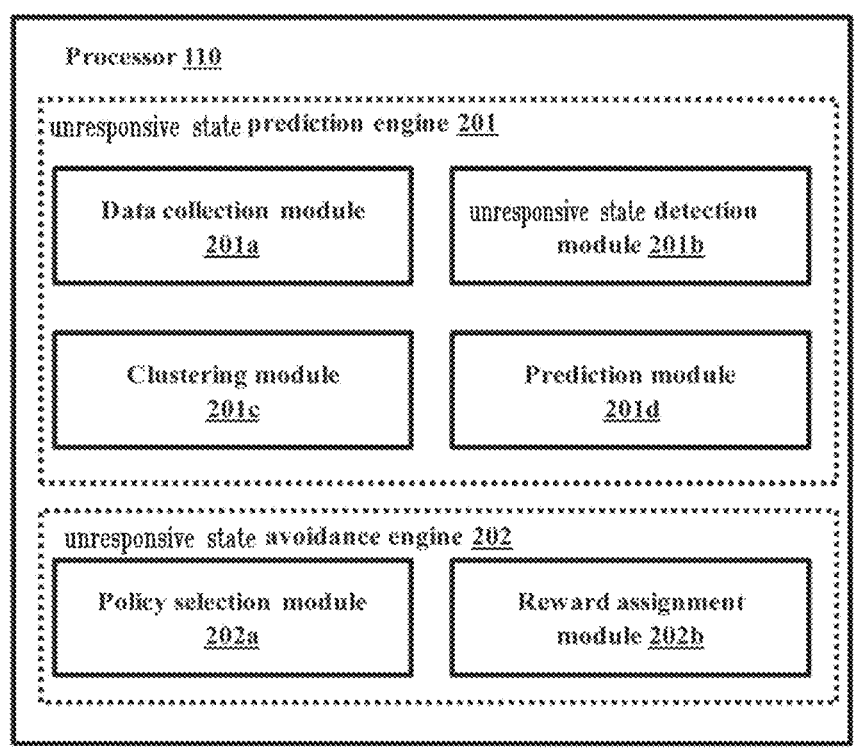
FIG. 2 is a block diagram illustrating various modules of a processor for controlling an unresponsive state of an electronic device, according to an embodiment.

FIG. 2 is a block diagram illustrating various modules of the processor 110 for controlling an unresponsive state of the electronic device 100, according to an embodiment. The processor 110 includes an unresponsive state prediction engine 201 and an unresponsive state avoidance engine 202.

The unresponsive state prediction engine 201 includes a data collection module 201a, an unresponsive state detection module 201b, a clustering module 201c, and a prediction module 201d for predicting the unresponsive state of the electronic device 100 in response to one or more user activities.

The data collection module 201a can be configured to collect the device parameters, the user usage patterns, and the user usage pattern parameters upon detecting the one or more user activities. The data collection module 201a communicates with at least one of the at least one hardware module 106, the at least one software module 108, and the memory 102, and collects the device parameters for each user activity and the user usage patterns over a period of time. The data collection module 201a provides the collected device parameters, the user usage pattern parameters, and the user usage patterns to the unresponsive state detection module 201b.

The unresponsive state detection module 201b can be configured to detect the at least one device parameter and/or the at least one user usage pattern that can be responsible for causing the unresponsive state of the electronic device 100. The unresponsive state detection module 201b performs a Causal Structure Analysis (CSA) on the collected at least one device parameter and/or at least one user usage patterns and generates a Directed Acyclic Graph (DAG) of the collected at least one device parameter and/or at least one user usage patterns using an Additive Noise Model (ANM). The DAG includes a plurality of nodes representing at least one of the device parameter(s) and the user usage pattern parameter(s) and an unresponsive state node. The unresponsive state node can be associated with unresponsive state conditions. Examples of the unresponsive state conditions include, but are not limited to, launch time, frame drop, touch latency, etc. Further, in the DAG, edges between the nodes (i.e., connections between the nodes) represent the causal-effect relation among the nodes (the device parameter(s) and the user usage pattern parameter(s)). The prediction module 201d uses the causal-effect relation among the nodes and identifies nodes that are connected to the unresponsive state node and the nodes that are not connected to the unresponsive state node. The nodes that are not connected to the unresponsive state node can be referred herein as island nodes.

The sluggishness detection module 201b further detects the device parameter(s) and/or user usage pattern parameter(s) represented by the island nodes, that are not responsible for causing the unresponsive state (e.g., the respective parameter is not greater than the pre-defined threshold). The unresponsive state detection module 201b does not consider the device parameters and/or user usage patterns represented by the island nodes for predicting the unresponsive state.

The unresponsive state detection module 201b detects the device parameters and/or user usage patterns represented by the nodes that are connected to the unresponsive state node as parameters that may be responsible for causing the unresponsive state. The device parameters and/or user usage patterns that may cause the unresponsive state are referred herein as the unresponsive state parameters.

For example, consider that $X_1 \ldots X_p$ as the device parameters and the user usage pattern parameters, $L(X)$ as a joint distribution of the device parameters and the user usage pattern parameters, and $PA_j$ as the minimal subset of $\{X_1 \ldots X_{j-1}\}$ such that $P_r(X_j|PA_j)=P_r(X_j|X_1 \ldots X_{j-1})$. Then the '$PA_j$' can be considered as Markovian parents of j. In other words, every variable $X_i$ can be associated with a minimal set of predecessors that are sufficient for determining its value. Then, the joint distribution may be expressed as $$P_r(X_1 \ldots X_p) = \Pi_{i=1}^{p} P_r(X_i|PA_i).$$

A decomposition (as shown above) of the joint distribution can be used to recursively construct the DAG by making every variable $X_i$ a node in the graph, and drawing directed edges from every node in $PA_i$ to $X_i$. The DAG can be a Bayesian Network.

Further, consider that $X_1, X_2 \ldots X_{n-1}, X_n$ is a set of parameters (including the device parameter(s) and/or the user usage pattern parameter(s)) and $X_n$ is the parameter to be predicted, wherein the $X_n$ is the unresponsive state node. The unresponsive state detection module 201b performs the CAS on the $X_1, X_2 \ldots X_{n-1}$ that illustrate the causal-effect relation (causal influence) of other parameters on the $X_n$. Further, the CAS differentiates parameters $X_{n-2}$ that form an island to indicate that the $X_{n-2}$ cannot influence the parameter $X_n$ (the prediction). Thus, based on the CAS, the unresponsive state detection module 201b detects the parameters (unresponsive state parameters) that are responsible for causing the unresponsive state of the electronic device.

The clustering module 201c can be configured to cluster the unresponsive state into the 4D clustering model. The clustering module 201c uses the 4D clustering model to classify the at least one unresponsive state parameter into at least one of a responsive state cluster(=non-unresponsive state cluster) and an unresponsive state cluster. Each unresponsive state cluster may indicate the unresponsive state condition. Examples of the unresponsive state condition include, but are not limited to, launch time exceeding the pre-defined threshold, frame drop exceeding the pre-defined threshold, touch latency exceeding the pre-defined threshold, etc. The 4D clustering model can include methods that can be used for classifying the unresponsive state parameters into at least one cluster. The methods included in the 4D clustering model can be at least one of clustering methods, machine learning methods, and so on.

Embodiments herein further classify the unresponsive state parameters into the at least one cluster using a K-means clustering method as an example, but it is understood that one or more other embodiments are not limited thereto, and any other suitable clustering methods can be considered. In accordance with the K-means clustering method, the clustering module 201c represents the unresponsive state parameters in a form of a 4D map, wherein each data point of the 4D map represents the at least one unresponsive state parameter. The clustering module 201c determines a number of center points in the 4D map and forms an associated number of clusters around the determined center points, wherein each cluster can be at least one of the responsive state cluster (=non-unresponsive state cluster) and the unresponsive state cluster indicating the unresponsive state condition and each cluster can be assigned with a mean value (summation of all data points). Thereafter, the clustering module 201c classifies the unresponsive state parameters into the at least one cluster based on a nearest mean value (at least distance). For example, the clustering module 201c may find 4 center points and form 4 clusters, wherein a first cluster may be the responsive cluster (=non-unresponsive state cluster), a second cluster may be the unresponsive state cluster indicating the launch time exceeding the pre-defined threshold (the unresponsive state condition), a third cluster may be the unresponsive state cluster indicating the frame drop exceeding the pre-defined threshold (the unresponsive state condition), and a fourth cluster may be the unresponsive state cluster indicating the touch latency exceeding the pre-defined threshold (the unresponsive state condition). The clustering module 201c further determines that a first unresponsive state parameter may be nearest to the second cluster (based on mean value) and classifies the first unresponsive state parameter into the second cluster.

The prediction module 201d can be configured to predict the unresponsive state of the electronic device 100 by determining a source of the unresponsive state based on the classification of the unresponsive state parameters into the at least one cluster. The prediction module 201d determines the responsive state (=non-unresponsive state), if the unresponsive state parameters belong to the responsive cluster (=non-unresponsive state cluster). The prediction module 201d predicts the unresponsive state, if the unresponsive state parameters belong to the unresponsive state cluster indicating at least one unresponsive state condition. The prediction module 201d identifies the unresponsive state condition associated with the unresponsive state cluster for which the unresponsive state parameters belong to. The prediction module 201d further checks if the unresponsive state parameter(s) belonging to the unresponsive state cluster can cause the unresponsive state condition (associated with the cluster) and accordingly considers the sluggish parameter(s) as the source of unresponsive state. The prediction module 201d checks if the unresponsive state parameter(s) can cause the unresponsive state condition using information stored in at least one of the memory 102 and an external entity (e.g., server, external storage, etc.) with respect to the unresponsive state parameters (domain knowledge).

By way of example, the PSS memory, the CPU temperature, the number of notifications received, the number of configuration changes, and the number of pending intents can be the unresponsive state parameters. If the unresponsive state parameters are classified into the responsive cluster (=non-unresponsive state cluster), then the prediction module 201d predicts the responsive state of the electronic device 100.

In an example herein, consider that the PSS memory, the CPU temperature, the number of notifications received, the number of configuration changes and the number of pending intents are classified into the cluster indicating an unresponsive state condition of exceeding frame drop. Then, the prediction module 201d determines that a sudden increase in the PSS memory may reduce the available free memory that may further lead to the frame drop (the sluggishness) and accordingly considers the PSS memory as the source of the unresponsive state.

In an example herein, consider that the PSS memory, the CPU temperature, the number of notifications received, the number of configuration changes and the number of pending intents are classified into the cluster indicating the unresponsive state condition of exceeding application launch time. In this case, the prediction module 201d predicts that the CPU temperature may increase due to very high loads on the resources of the electronic device 100, which may further slow down the launch of the application and accordingly considers the CPU temperature as the source of the unresponsive state.

In an example herein, consider that the PSS memory, the CPU temperature, the number of notifications received, the number of configuration changes and the number of pending intents are classified into the touch latency. In such a case, the prediction module 201d predicts that an increase in such unresponsive state parameters may increase a delay in drawing the notifications from the memory 102 to the display 104, which may lead to the unresponsive state and accordingly considers the number of notifications received, the number of configuration changes and the number of pending intents as the source of the unresponsive state.

The unresponsive state avoidance engine 202 includes a policy selection module 202a and a reward assignment module 202b for reducing/avoiding the predicted unresponsive state. The unresponsive state avoidance engine 202 operates only when the unresponsive state of the electronic device 100 is predicted.

The policy selection module 202a can be configured to configure the at least one policy that is to be applied on the device parameter(s) associated with the source of the unresponsive state for reducing the unresponsive state. The device parameter(s) associated with the source of the unresponsive state can be the parameters exceeding the pre-defined threshold. The policy can be at least one of the configuration change policy, the notification policy, the memory policy, and so on. Further, each policy may include one or more actions. For example, the configuration change policy may include actions such as, but not limited to, deferring the configuration change for empty applications, deferring the configuration change for the empty applications and the services, deferring the configuration change for the empty applications, the services and content providers, and so on. The notification policy may include actions such as, but not limited to, deferring ranking/sorting of the notifications, deferring a process of drawing the notifications, and so on. The memory policy may include actions such as, but not limited to, triggering a cleaning of garbage collection (unwanted data) in the memory 102, trimming/freeing the memory 102, controlling background applications, services and cached applications and so on.

The policy selection module 202a can select the at least one policy for reducing the unresponsive state based on a reinforcement learning. The policy selection module 202a initially selects the at least one policy randomly. For example, the policy selection module 202a may select the configuration change policy on predicting that the source of the unresponsive state is associated with the application launch time. The policy selection module 202a may select the notification policy on predicting that the source of the unresponsive state is associated with the touch latency. The policy selection module 202a may select the memory policy on predicting that the source of the unresponsive state is associated with the frame drop. Further, the policy selection module 202a may dynamically select the at least one policy by learning the reward associated with the previous policies selected for reducing the unresponsive state. The reward referred herein can be in a form of points, values, grades and so on.

After selecting the at least one policy, the policy selection module 202a selects at least one action from the at least one policy. In an embodiment, the policy selection module 202a may select the at least one action based on at least one of the user usage patterns and/or the user usage pattern parameter(s). Thus, tailor made sequence of actions are selected for every individual user based on at least one of the user usage patterns and/or the user usage pattern parameter(s). The policy selection module 202a applies the selected at least one action on the device parameters of the at least one hardware module 106 and/or the at least one software module 108 that are associated with the source of the unresponsive state.

By way of example, the PSS memory is considered as the source of the unresponsive state causing the frame drop during the launch of the at least one application. The policy selection module 202a can select the memory policy for avoiding the frame drop, since the PSS memory is the source of the unresponsive state. Further, the policy selection module 202a analyzes the user usage patterns and determines that the user rarely clears the unwanted data in the memory 102. Accordingly, the policy selection module 202a selects the action of trimming memory from the memory policy. The policy selection module 202a further identifies and applies the selected action on the memory 102 that is related to the source of the unresponsive state.

Consider an example herein, wherein the number of pending notifications (notification access) is considered as the source of the unresponsive state that may cause the touch latency to exceed the pre-defined threshold. In this case, the policy selection module 202a can select the notification policy for improving the touch latency, since the number of notifications pending is the source of the unresponsive state. Further, the policy selection module 202a analyzes the user usage patterns and determines that the user clears the notifications immediately. Accordingly, the policy selection module 202a selects the action of deferring notifications draw for improving the touch latency. The policy selection module 202a further identifies the operating conditions (device parameters) of the notification drawer module may be related to the source of the unresponsive state and applies the selected action on the operating conditions of the notification drawer module. Thus, the notification drawer module may display new notifications to the user instead of displaying the notifications based on the ranking, which may improve the touch latency.

The reward assignment module 202b can be configured to assign the reward to each policy that is selected by the policy selection module 202a for reducing the unresponsive state. The reward assignment module 202b assigns the reward to the policy based on the at least one action selected from the policy for reducing the unresponsive state and an effect of the action for a pre-defined time. Thus, choosing the best action within the policy gives the maximum reward. The effect of the action herein indicates an unresponsive state count identified for the pre-defined time. The unresponsive state count is a measurement of unresponsive state occurrence after applying the at least one action on the at least one device parameter associated with the source of the unresponsive state. If the at least one applied action did not reduce the unresponsive state count, the reward assignment module 202b then assigns negative reward points for the corresponding policy. If the applied at least one action reduces the unresponsive state count (in a next periodic interval), then the reward assignment module 202b assigns positive reward points for the corresponding policy so that the policy selection module 202a can select that policy in the future. Thus, the reward assigned for the policy helps in selecting the policy in a dynamic sequence to maximize the reward that is tailor made for the unique user's usage pattern.

For example, the reward assignment module 202b assigns the reward to the policy based on the reinforcement learning/Q-learning as illustrated using the below equation:

$$Q(S,A)=Q(S,A)+\alpha(R+\gamma Q(S_0,A_0)-Q(S,A))$$

wherein, $\alpha$ is the learning rate that may be ($0<\alpha\leq 1$), the learning rate can be set to 1 on detecting the reduction of the unresponsive state count, and $\gamma$ can be a discount rate that modifies the state considering the future states.

FIG. 2 show exemplary units of the processor 110, but it is to be understood that one or more other embodiments are not limited thereto. For example, according to one or more other embodiments, the processor 110 may include less or more number of units. Further, the labels or names of the units are used only for illustrative purpose and does not limit the scope of embodiments herein. One or more units can be combined together to perform the same or substantially similar function in the processor 110.

Figure 3:
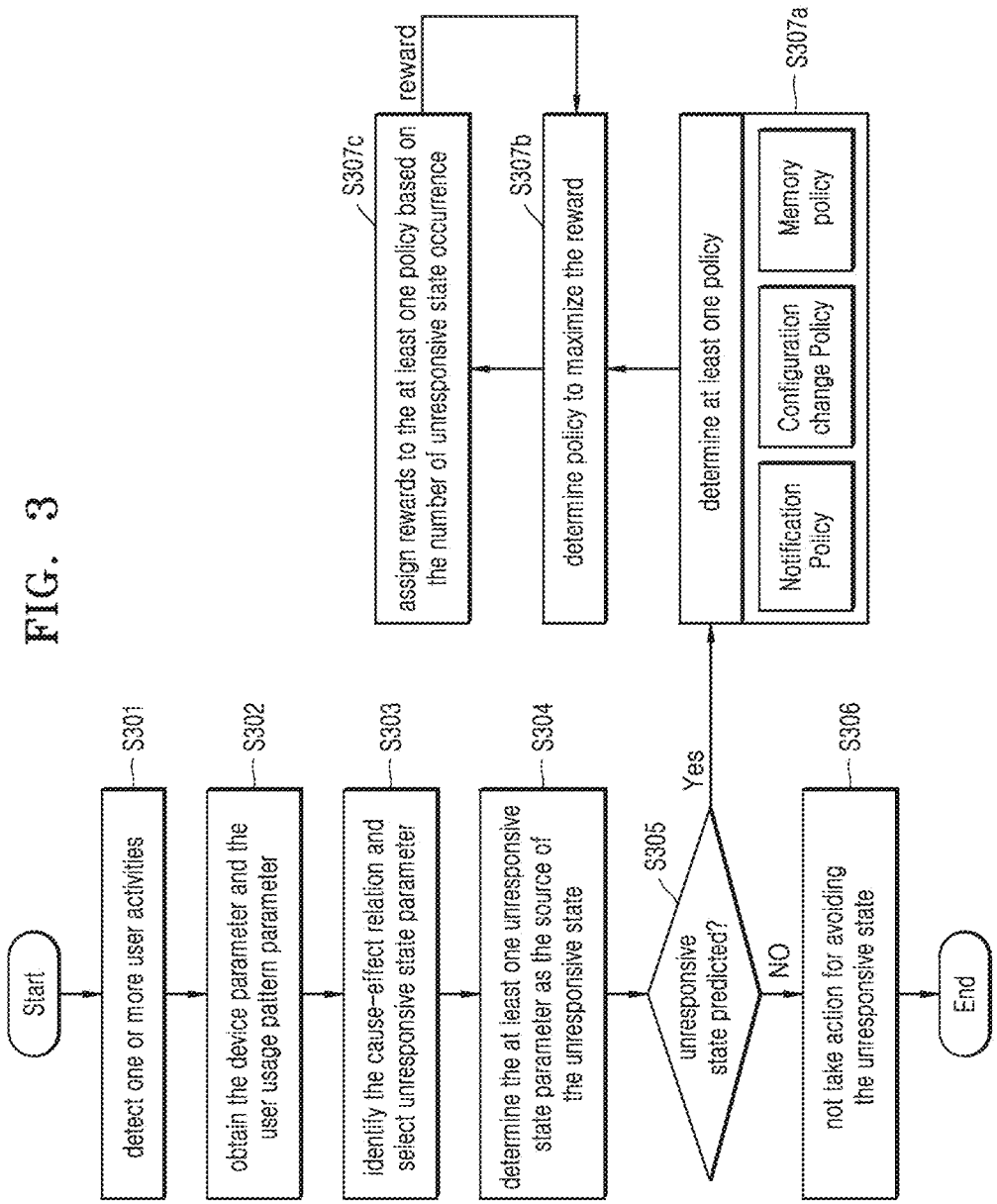
FIG. 3 is an example flow diagram illustrating a method for controlling an unresponsive state of an electronic device, according to an embodiment.

FIG. 3 is an example flow diagram illustrating a method for controlling an unresponsive state of an electronic device 100, according to an embodiment.

Referring to FIG. 3, in operation S301, the processor 110 detects one or more user activities (such as launching of an application, interaction with content displayed on a display by performing gestures (such as scroll, tap, drag, swipe and/or the like), and so on). In operation S302, based on detecting the one or more user activities, the processor 110 collects (e.g., obtain, etc.) the device parameter(s) and the user usage pattern parameter(s) by communicating with the at least one hardware module 106 and the at least one software module 108. In operation S303, the processor 110 identifies a cause-effect relation among the collected device parameter(s) and the collected user usage parameter(s) and accordingly selects (e.g., determines, identifies, etc.) one or more unresponsive state parameters from the collected device parameter(s) and the collected user usage pattern parameter(s) as the parameter(s) that may cause the unresponsive state. In operation S304, the processor 110 further classifies the selected unresponsive state parameter(s) into at least one cluster using at least one of a clustering method and a machine learning method, wherein the cluster can be at least one of a responsive cluster (=non-unresponsive state cluster) and an unresponsive state cluster indicating the unresponsive state condition. Based on the classification of the unresponsive state parameter(s) into the at least one cluster, the processor 110 determines the at least one unresponsive state parameter as the source of unresponsive state.

In operation S305, the processor 110 further predicts the unresponsive state based on the source of unresponsive state. In operation S306, if the unresponsive state is not predicted, the processor 110 then does not take action to reduce (e.g., avoid) the predicted unresponsive state. In operation S307a, if the unresponsive state is predicted, the processor 110 selects at least one policy and applies at least one action of the selected at least one policy on the at least one device parameter that is associated with the source of unresponsive state (based on at least one of the user usage pattern(s) and/or the user usage pattern parameter(s)). In operation S307b, the processor 110 selects the at least one policy based on the rewards associated with the policies that have been previously applied on the at least one device parameter related to the at least one hardware module 106 and/or the at least one software module 108. The processor 110 may select a policy in a dynamic sequence to maximize rewards based on the user usage pattern parameter(s). In operation S307c, the processor 110 further assigns rewards to the policy based on the selected action(s) and the effect(s)

of the selected action(s). The processor 110 assigns a positive reward for the policy based on a decrease in the number of unresponsive state occurrences during a period of the time (e.g., predetermined period of time). In other words the processor 110 assigns the positive reward for the policy, if the unresponsive state count is reduced after applying the action of that policy. The processor 110 assigns a negative reward for the policy, based on an increase in the number of unresponsive state occurrences during the period of time (or based on the number of unresponsive state occurrences during the period of time being greater than a threshold value). In other words, the processor 110 assigns the negative reward for the policy, if the unresponsive state count has not reduced even after applying the action of that policy.

Figure 4:
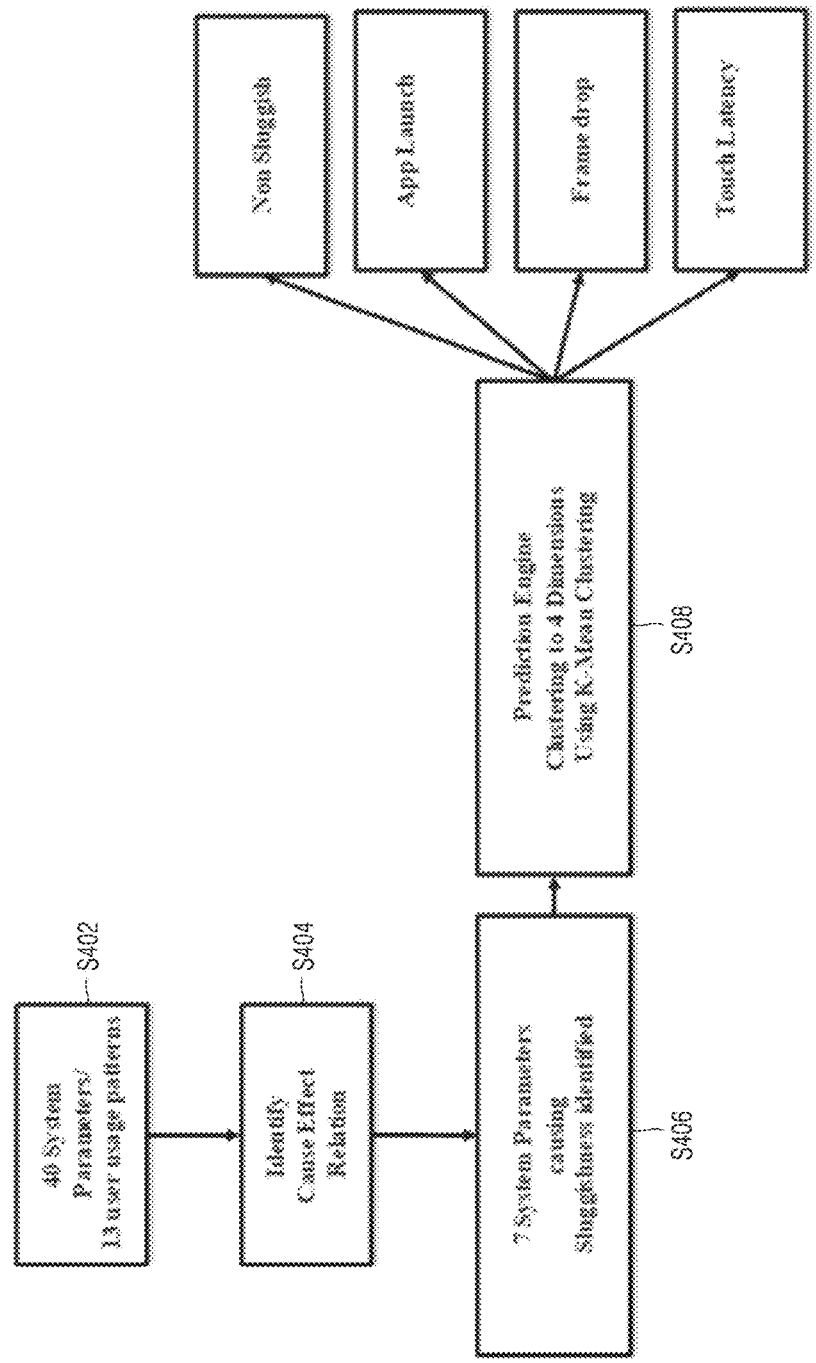
FIG. 4 is an example flow diagram illustrating prediction of an unresponsive state of an electronic device, according to an embodiment.

FIG. 4 is an example flow diagram illustrating prediction of an unresponsive state of an electronic device 100, according to an embodiment. Referring to FIG. 4, in operation S402, the processor 110 collects 40 device parameters and 13 user usage pattern parameters in response to (or based on) receiving at least one user input to the electronic device 100. The processor may receive the at least one user input in response to (or based on) detecting at least one user activity (for example, launching of an application). In operation S404, the processor 110 performs the CSA on the 40 device parameters and the 13 user usage pattern parameters and generates the DAG. In the DAG, the edges between the nodes corresponding to the 40 device parameters and 13 user usage pattern parameters may represent the cause-effect relation. According to an embodiment, the user usage patterns of the user may be defined by combining at least one the user pattern parameters. In operation S406, the processor 110 identifies 7 device parameters as the unresponsive state parameters that may cause the unresponsive state of the electronic device 100, based on the cause-effect relation.

In operation S408, the processor 110 classifies the 7 device parameters into the at least one cluster using the 4D clustering model (for example, the K-means clustering method). In an example herein, the number of clusters formed using the 4D clustering model may be 4, wherein a first cluster may be the responsive cluster (=non-unresponsive state cluster), a second cluster may indicate the launch time of the application exceeding the pre-defined threshold (one of the unresponsive state conditions), a third cluster may indicate the frame drop (one of the unresponsive state conditions), and a fourth cluster may indicate the touch latency exceeding 1 second (one of the unresponsive state conditions). Based on the classification of the 7 device parameters into the at least one cluster, the processor 110 predicts the unresponsive state by determining that one of the 7 device parameters can be the source of the unresponsive state.

Figure 5A:
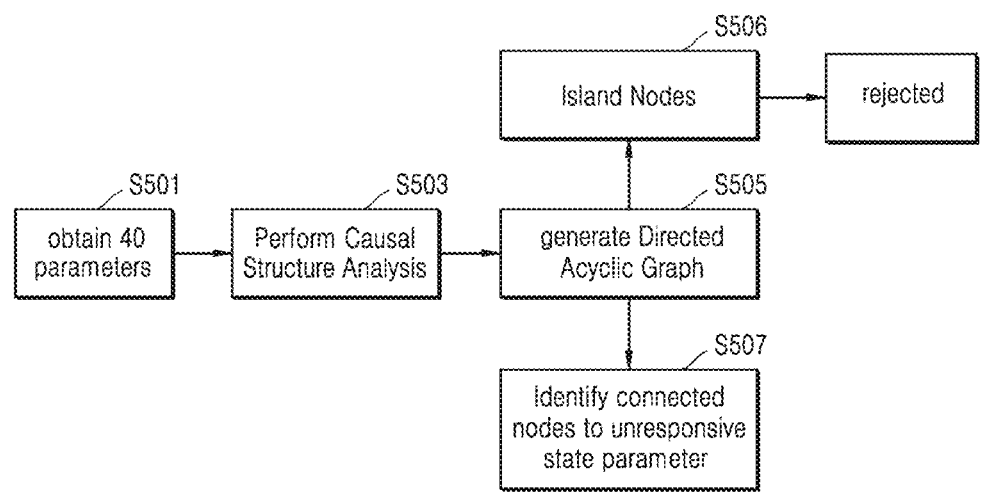
FIG. 5A is an example diagram illustrating a method for determining an unresponsive state parameter, according to an embodiment.
Figure 5B:
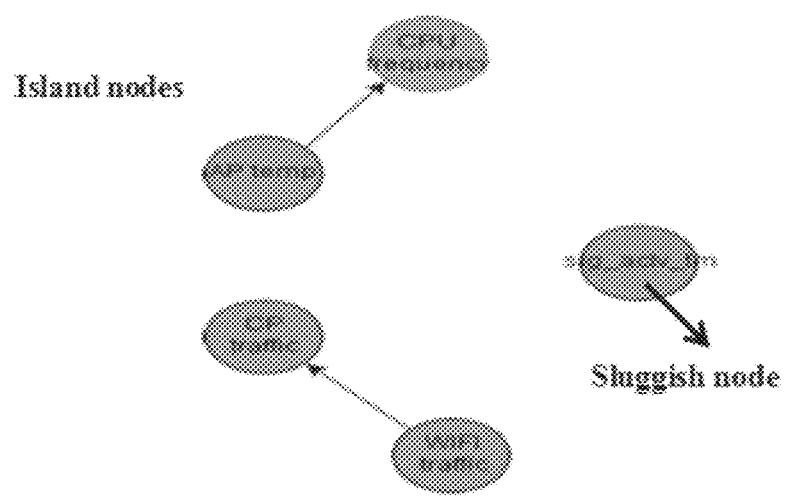
FIG. 5B is an example diagram illustrating a method for determining an unresponsive state parameter, according to an embodiment.

FIG. 5A is an example diagram illustrating a method for determining an unresponsive state parameter, according to an embodiment. FIG. 5B is an example diagram illustrating a method for determining an unresponsive state parameter, according to an embodiment. In operation S501, the processor of the electronic device may collect 40 device parameters/system parameters that are considered for predicting the unresponsive state. In operation S503, the processor 110 may perform the Causal Structure Analysis (CSA) on the 40 device parameters. In operation S505, the processor 110 may generate the Directed Acyclic Graph (DAG). The DAG may include 40 nodes representing the 40 device parameters and the unresponsive state node(s). In operation S506, the processor 110 may identify the island nodes based on the edges of the nodes. In operation S507, the processor may identify the nodes connected to the unresponsive state nodes. According to an embodiment, the island nodes may be the nodes that do not influence the unresponsive state node (i.e., the island nodes are not connected to the unresponsive state node), as illustrated in FIG. 5B. In an embodiment, the island nodes may represent the device parameters such as the CPU frequency, the processor temperature, the CP traffic, the Wi-Fi traffic, or the like. The processor 110 rejects the device parameters represented by the island nodes and does not consider such device parameters for predicting the unresponsive state.

Figure 5C:
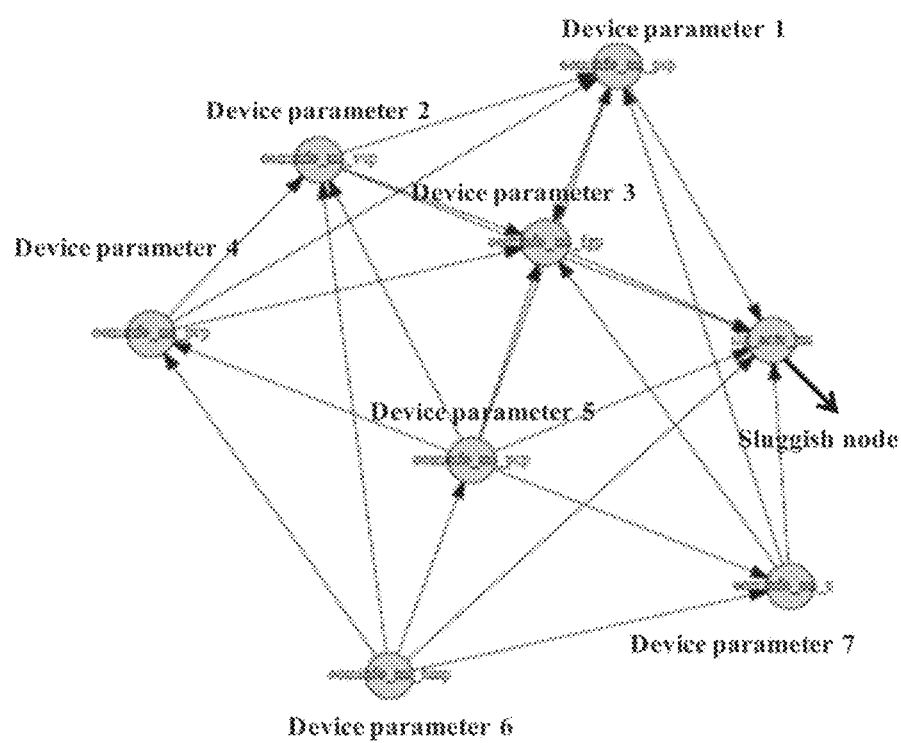
FIG. 5C is an example diagram illustrating a method for determining an unresponsive state parameter, according to an embodiment.

As set forth above, FIG. 3 is an example flow diagram illustrating a method for controlling an unresponsive state of an electronic device 100, according to an embodiment. By way of example, consider that 7 nodes representing the 7 device parameters are connected to the unresponsive state node (influencing the unresponsive state node) as illustrated in FIG. 5C. The processor 110 determines the 7 device parameters connected to the unresponsive state node as the unresponsive state parameters that may cause the unresponsive state of the electronic device 100.

Figure 6:
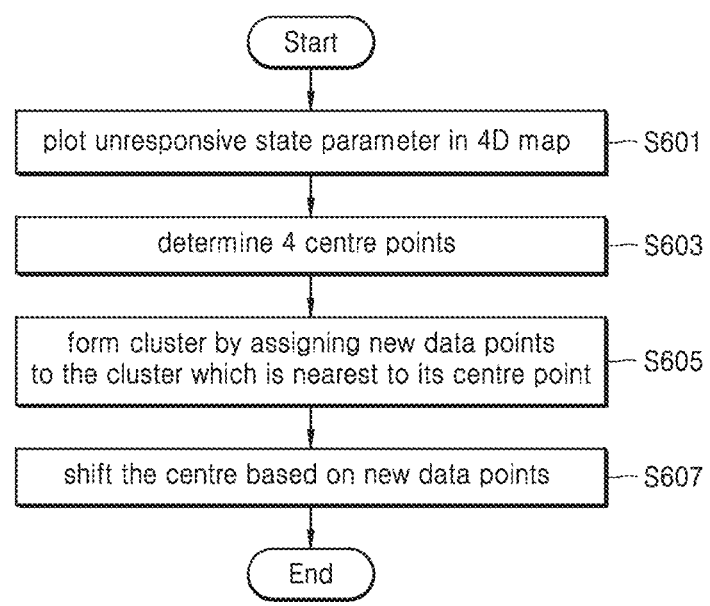
FIG. 6 is an example flow diagram illustrating a method for clustering at least one unresponsive state parameter using a four-dimensional (4D) clustering model, according to an embodiment.

FIG. 6 is an example flow diagram illustrating a method for clustering at least one unresponsive state parameter using a 4D clustering model, according to an embodiment. While the clustering of the unresponsive state parameters of the present embodiment considers the K-means clustering method as an example, it is understood that one or more other embodiments are not limited thereto, and other suitable clustering methods can be implemented.

Referring to FIG. 6, in operation S601, once the unresponsive state parameters are identified, the processor 110 may plot the unresponsive state parameters in the 4D map. In operation S603, the processor 110 may determine the number of center points present in the 4D map and determine at least one center point based on the determined number of center points. While in the example herein, the number of center points is exemplified as four, it is understood that one or more other embodiments aer not limited thereto, and any number of center points can be determined. In operation S605, based on the four center points, the processor 110 forms the four clusters by assigning the mean value for each cluster, wherein each cluster may indicate at least one of the responsive state (=non-unresponsive state) condition and the unresponsive state conditions. In an embodiment, the processor 110 further partitions the unresponsive state parameters represented in the 4D map into the at least one cluster based on the distance determined for each cluster. For example, if one of the source parameters is nearest to the second cluster (least distance), then the processor 110 classifies that source parameter to the second cluster. In operation S607, the processor 110 may also shift clusters (change the mean values) based on the new source parameters. The processor 110 further uses the 4D clustering to predict the unresponsive state of the electronic device 100.

Figure 7A:
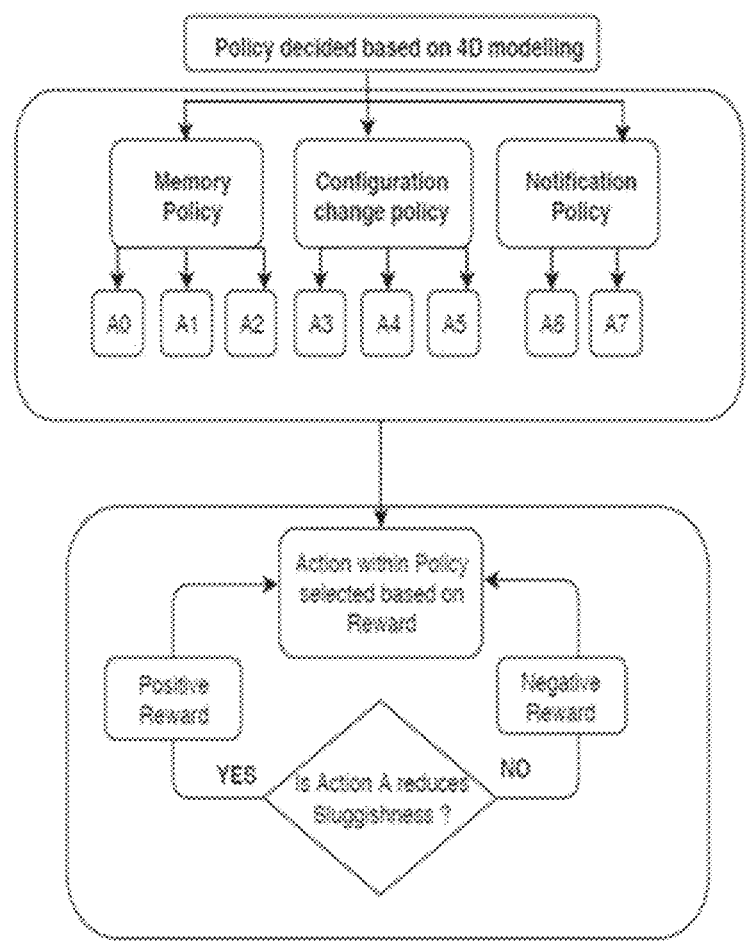
FIG. 7A is an example diagram illustrating a method for selecting a policy for reducing a predicted unresponsive state of an electronic device, according to an embodiment.

FIG. 7A is an example diagram illustrating a method for selecting a policy for reducing a predicted unresponsive state of the electronic device, according to an embodiment.

Referring to FIG. 7A, if the policies are not associated with any rewards, the processor 110 selects the at least one policy based on the 4D clustering model. After selecting the policy, the processor 110 selects the at least one action of the at least one policy to be applied on the at least one device parameter (of the at least one hardware module 106 and/or the at least one software module 108) that may be associated with the source of the unresponsive state. The processor 110 selects the at least one action based on at least one of the user usage pattern(s) or the user usage pattern parameter(s).

In an embodiment, the policy may include at least one of a configuration change policy, a notification policy, and a memory policy. In an example herein, the memory policy may include three actions (A0, A1 and A2), the configuration change policy may include three actions (A3, A4 and A5) and the notification policy may include two actions (A6 and A7). According to an embodiment, based on the unresponsive state being predicted due to the touch latency exceeding the pre-defined threshold, the processor 110 may select the notification policy as the policy for avoiding the predicted unresponsive state, so that the touch latency may not exceed the pre-defined threshold. For example, the notification policy may include actions such as, but not limited to, sorting/deferring the ranking of the notifications, deferring notification draw (rendering, outputting and/or display) and so on. The processor 110 may further select and apply the at least one action of the notification policy on the device parameter (of the notification drawer or outputter) that is associated with the source of unresponsive state (i.e., the touch latency exceeding the pre-defined threshold). The processor 110 may select the at least one action based on at least one of the user usage pattern(s) and the user usage pattern parameter(s). For example, the processor 110 may apply the action of deferring the notification, based on the unresponsive state parameter associated with the source of unresponsive state, if the user rarely clears the notifications present in the electronic device 100 and if there are a lot of notifications pending for the user. For example, the processor 110 may apply the action of deferring the notification draw on the device parameter associated with the source of unresponsive state, if the user acts on the notifications immediately and if the user receives new notifications during the launch of the application.

The processor 110 further assigns at least one of the positive reward and the negative reward to the policy selected for avoiding the unresponsive state. The processor 110 further assigns the reward to the policy based on the action of the corresponding policy applied on the at least one device parameter associated with the source of unresponsive state and the effect of the applied action. Thus, the processor 110 may select the action to be applied based on the reward. The processor 110 assigns a positive reward to the policy, when the action selected from the policy reduces the unresponsive state count (=the number of the unresponsive state occurrence). The processor 110 assigns a negative reward to the policy, when the action selected from the policy increases the unresponsive state count. Thus, the rewards may help the processor 110 in selecting the policy in a dynamic sequence to maximize the rewards that are customized for the unique user's usage pattern.

Figure 7B:
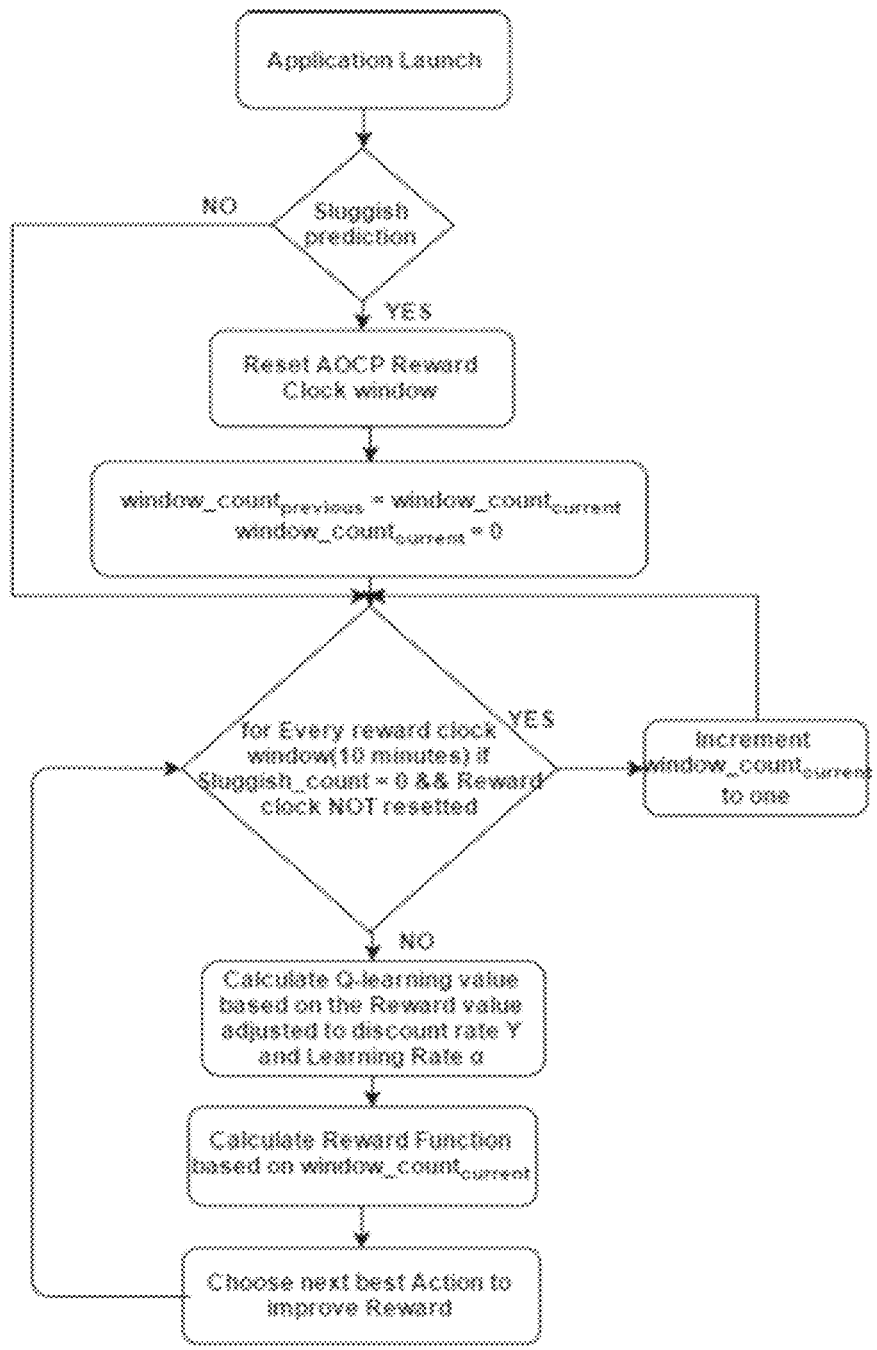
FIG. 7B is an example flow diagram illustrating a method for assigning at least one reward to at least one policy, according to an embodiment.

FIG. 7B is an example flow diagram illustrating a method for assigning at least one reward to the at least one policy, according to an embodiment. Referring to FIG. 7B, the processor 110 detects the one or more user activities and predicts the unresponsive state using the device parameters and the user usage patterns. The processor 110 further checks whether the unresponsive state has been predicted or not. If the unresponsive state has been predicted, the processor 110 selects the policy based on the rewards associated with the policies and applies the at least one action of the selected policy based on the usage patterns for avoiding the predicted unresponsive state.

After applying the at least one action, the processor 110 monitors for the unresponsive state count over a pre-defined time. The processor 110 further resets a reward clock for the predefined time, so that processor 110 can monitor for the unresponsive state count for the pre-defined time (for example: 10 minutes).

The processor further assigns "zero" to a window count parameter (indicates the reward points) for the policy. If the unresponsive state count is zero, then the processor 110 increments the window count parameter by 1 (awarding the positive reward to the policy). If the unresponsive state count is not zero, the processor 110 then calculates the Q-learning value based on the reward value adjusted to the discount rate and the learning rate.

If the unresponsive state has not been predicted, the processor 110 assigns "one" to the window count parameter (the positive reward point). The processor 110 further calculates the reward points based on a current value of the window count parameter associated with the policy. The processor 110 may further choose the next best action of the policy to improvise the reward assigned for that policy and may execute the above steps for assigning the reward for each action of the policy.

Figure 8A:
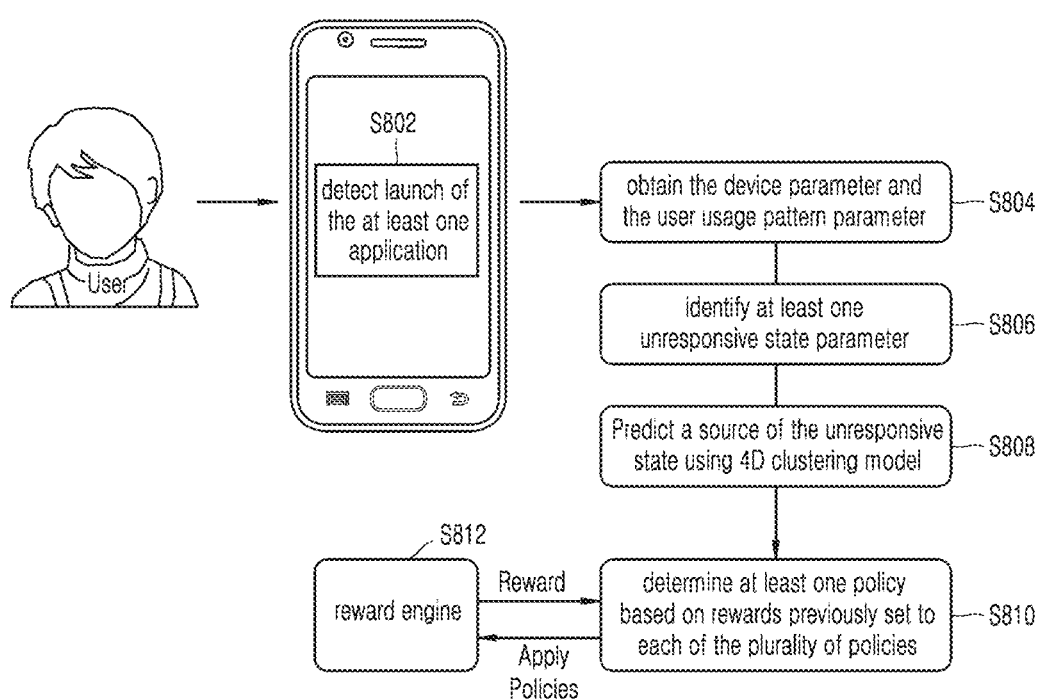
FIG. 8A is an example illustrating management of an application launch by predicting and avoiding an unresponsive state, according to an embodiment.
Figure 8B:
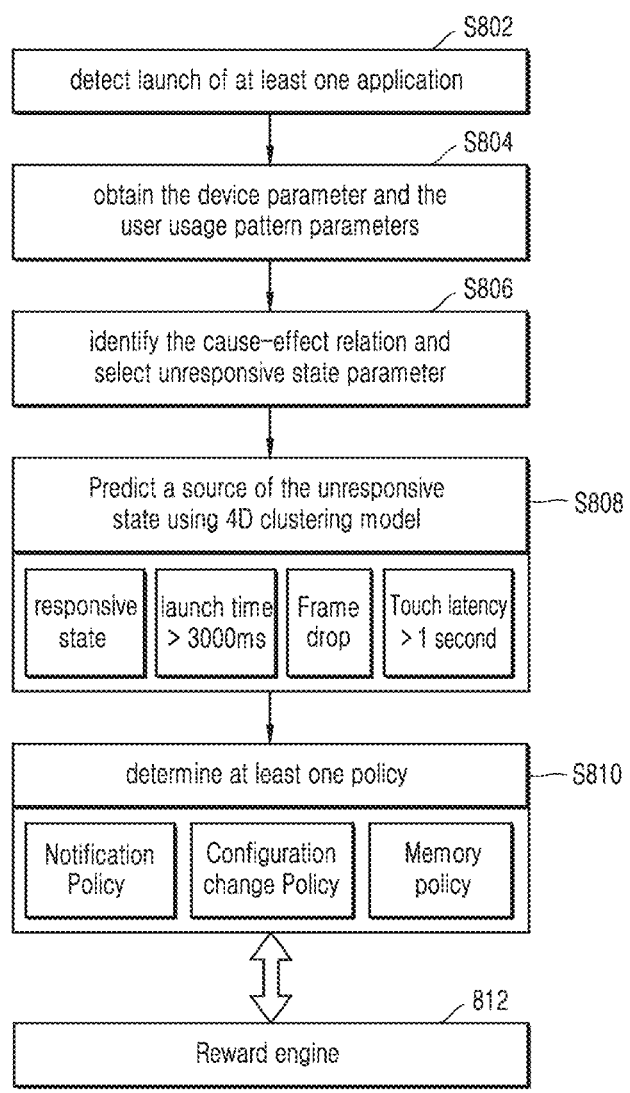
FIG. 8B is an example illustrating management of an application launch by predicting and avoiding an unresponsive state, according to an embodiment.

FIG. 8A is an example illustrating management of an application launch by predicting and avoiding the unresponsive state, according to an embodiment. FIG. 8B is an example illustrating management of an application launch by predicting and avoiding the unresponsive state, according to an embodiment.

Referring to FIGS. 8A and 8B, in operation S802, the processor 110 of the electronic device 100 may detect an application being launched by the user of the electronic device 100. In operation S804, the processor 110 may collect the device parameters and the user usage pattern parameter. In operation S806, the processor 110 may identify the unresponsive state parameters among the collected device parameters and the user usage pattern parameter to determine the unresponsive state parameters that may cause the unresponsive state. For example, the PSS memory, the number of notifications received, the number of configuration changes occurred and the number of pending intents can be the unresponsive state parameters.

In operation S808, the processor may predict a source of the unresponsive state using a 4D clustering model. For example, after determining the unresponsive state parameters, the processor 110 uses the 4D clustering model to partition the unresponsive state parameters into at least one of the responsive cluster (=non-unresponsive state cluster) and the unresponsive state clusters indicating the unresponsive state conditions (for example; the launch time exceeding the pre-defined threshold, the touch latency exceeding the pre-defined threshold, the frame drop exceeding the pre-defined threshold, etc.). By way of example, consider that the unresponsive state parameters are classified into the unresponsive state cluster indicating the frame drop. Based on the classification of the unresponsive state parameters into the at least one cluster, the processor 110 determines that the unresponsive state parameters are the source of the unresponsive state for the launch of the application. In an example herein, the processor 110 determines that the PSS memory is the source of the unresponsive state, since the PSS memory has been classified into the cluster indicating the frame drop.

In operation S810, once the unresponsive state has been predicted, the processor 110 selects the at least one policy to be applied on the at least one device parameter of the at least one hardware module 106 and/or the at least one software module 108 that are associated with the source of the unresponsive state. According to an embodiment, the processor 110 may select at least one policy based on each reward previously set to each of the plurality of policies. The processor 110 may receive each reward to be set to each of the plurality of policies, from the Reward Engine 812. In an example herein, the processor 110 may select the memory policy to be applied on the operating conditions of the memory 102, since the sudden reduction in availability of the memory is considered as the source for the frame drop. The processor 110 further selects the at least one action of the policy to be applied on the operating conditions of the memory 102 based on the user usage patterns. In an example herein, the processor 110 may select the trimming memory action of the memory policy if the user rarely clears the unwanted data stored in the memory 102.

The processor 110 further rewards the positive reward points or the negative reward points to the selected policy based on the applied action of the policy and the effect of the action. Thus, for future user activities (the application launch), the processor 110 may select the policy based on the reward points associated with the policies.

FIG. 9A is an example table illustrating device parameters that are collected for predicting the unresponsive state of the electronic device 100, according to an embodiment. Referring to FIG. 9A, the device parameters can be at least one of the application-related parameters, the thermal-related parameters, the memory parameters (the kernel memory-related parameters and the platform memory-related parameters) and so on (as illustrated in the example table of FIG. 9A).

FIG. 9B is an example table illustrating user usage pattern parameters that are collected for predicting the unresponsive state of the electronic device 100, according to an embodiment. Referring to FIG. 9B, the user usage patterns can be defined as or by at least one of the user usage pattern parameters. The user usage pattern parameters may include at least one of the notification parameters, the configuration parameters, the unique parameters and so on (as illustrated in the example table of FIG. 9B).

FIG. 9C is an example table illustrating the unresponsive state parameters that are responsible for causing the unresponsive state of the electronic device 100, according to an embodiment. Embodiments herein enable the processor 110 to perform the CSA on the collected device/system parameters and the user usage patterns and to generate the DAG. Based on the DAG, the processor 110 identifies the cause-effect relation among the collected parameters and determines the unresponsive state parameters from the collected parameters that may cause the unresponsive state of the electronic device 100. In an embodiment, the determined unresponsive state parameters can be at least one of the PSS memory (the memory-related parameter), the CPU temperature (the thermal-related parameter), the number of notifications received by the electronic device 100 (the notification parameter), the number of configuration changes (the configuration parameter), the number of pending intents (the unique parameter), and so on (as illustrated in the example table of FIG. 9C).

Figure 9D:
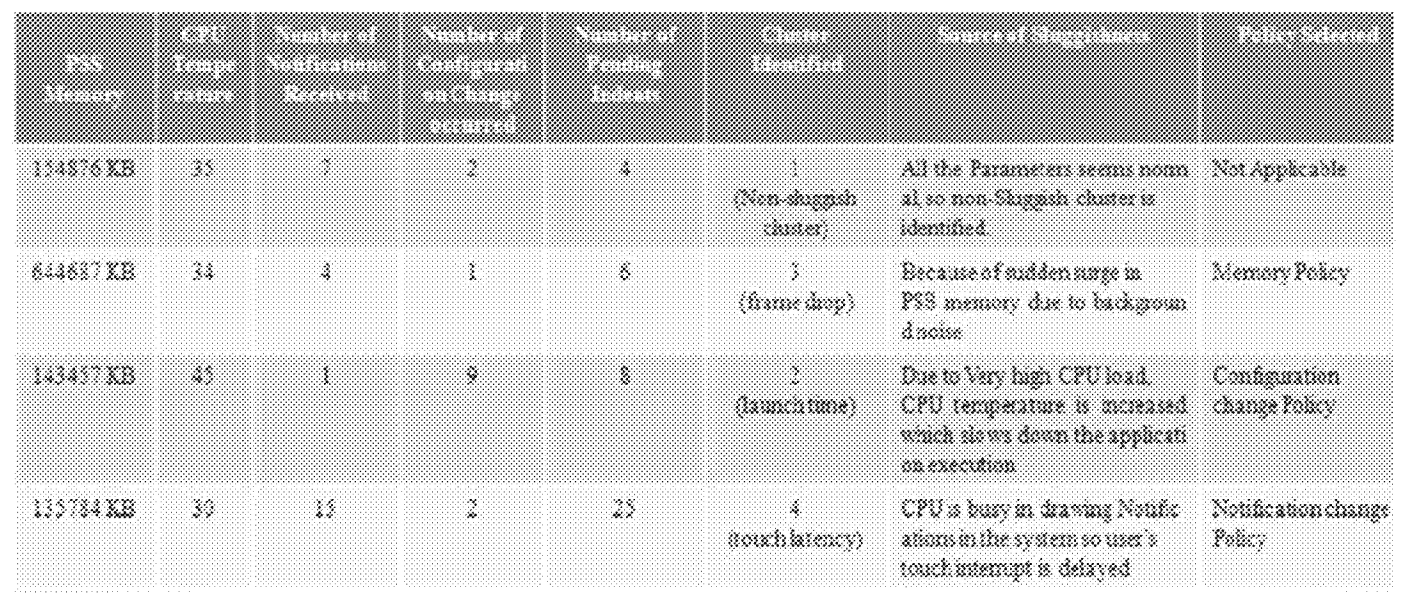

FIG. 9D is an example table illustrating a source of an unresponsive state of the electronic device 100 based on a cluster identified for the unresponsive state parameters and a policy selected for avoiding the predicted unresponsive state of the electronic device 100, according to an embodiment. One or more embodiments herein enable the processor 110 to detect the unresponsive state parameters using the cause-effect relation. By way of example, the PSS memory, the CPU temperature, the number of notifications received by the electronic device 100, the number of configuration changes, and the number of pending intents can be considered as the unresponsive state parameters that may cause the unresponsive state of the electronic device 100. The processor 110 classifies the detected unresponsive state parameters into at least one cluster using the clustering method and determines the source of unresponsive state. Further, based on the clustering, the processor 110 decides the policy for avoiding the predicted unresponsive state.

For example, if the unresponsive state parameters belong to the responsive cluster (=non-unresponsive state cluster), the processor 110 determines that the unresponsive state parameters are normal, so that the unresponsive state has not been predicted. In an example, consider that the unresponsive state parameters (the PSS memory, the CPU temperature, the number of notifications received by the electronic device 100, the number of configuration changes, and the number of pending intents) belong to the cluster associated with the frame drop condition. The processor 110 determines that a sudden increase in the PSS memory may reduce the availability of the free memory and considers the PSS memory as the source of unresponsive state. Further, the processor 110 selects the memory policy to avoid the frame drops.

In an embodiment, consider that the unresponsive state parameters (the PSS memory, the CPU temperature, the number of notifications received by the electronic device 100, the number of configuration changes and the number of pending intents) belong to the cluster associated with the launch time of the application. In such a case, the processor 110 determines that the increased load on the device resources can increase the CPU temperature, which may further increase the launch time. Thus, the processor 110 selects the CPU temperature as the source of unresponsive state and selects the configuration change policy to avoid the launch time exceeding the pre-defined threshold.

In an embodiment, consider that the unresponsive state parameters (the PSS memory, the CPU temperature, the number of notifications received by the electronic device 100, the number of configuration changes and the number of pending intents) belong to the cluster associated with the touch latency condition. In such case, the processor 110 determines that the increased delay in drawing the notifications from the memory 102 to the display may cause the touch latency to exceed the pre-defined threshold and considers that the number of notifications received by the electronic device 100, the number of configuration changes, and the number of pending intents as the source of unresponsive state. Further, the processor 110 selects the notification policy to improve the touch latency.

FIG. 9E is an example table illustrating actions of the at least one policy that can be used for reducing the unresponsive state of the electronic device 100, according to an embodiment. Referring to FIG. 9E, the memory policy may include actions such as an action A0, an action A1, an action A2, and so on. The action A0 can be for triggering cleaning of garbage collection of the memory 102. The action A1 can be for trimming/freeing (e.g., clearing) the memory 102. The action A2 can be for controlling background applications, services, cached applications, and so on.

Furthermore, the configuration change policy may include actions such as an action A3, an action A4, an action A5, and so on. The action A3 can be for deferring the configuration change for empty applications. The action A4 can be for deferring the configuration change for the empty applications, the services, and so on. The action A5 can be for assigning the configurations for the empty applications, the services, and content providers.

Additionally, the notification policy may include actions such as, but not limited to, an action A6, an action A7, and so on. The action A6 can be for deferring the ranking/sorting of the notifications. The action A7 can be for deferring the notification draw.

Figure 9F:
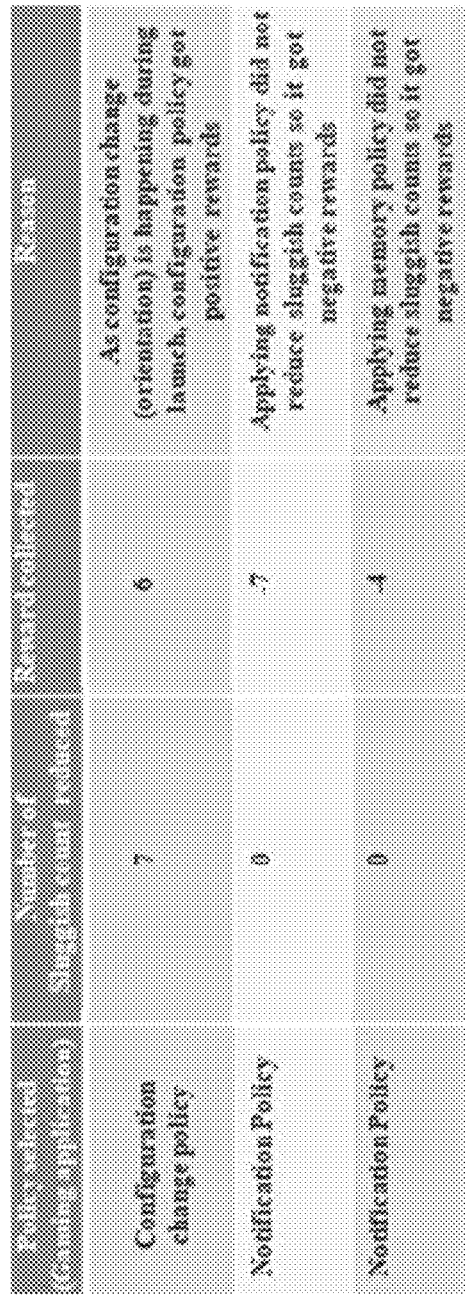
FIG. 9F is an example table illustrating assignment of rewards for a selection of a policy based on rewards for avoiding an unresponsive state of an electronic device, according to an embodiment.

FIG. 9F is an example table illustrating assignment of rewards for the selection of a policy based on rewards for avoiding an unresponsive state of an electronic device 100, according to an embodiment. One or more embodiments herein enable the processor 110 to assign the rewards for the policy based on the action of the corresponding policy applied on the at least one of the at least one software module 108 and/or the at least one hardware module 106 based on the user usage patterns and the effect of the applied action (reduced/increased unresponsive state count).

Consider an example scenario, wherein the unresponsive state has been predicted when the user launches a gaming application. In such a scenario, the processor 110 selects the policy for avoiding the unresponsive state based on the rewards assigned for the policies previously applied for the gaming application. The rewards associated with the policies that have been previously applied for improving launch time of the gaming application is illustrated in the example table of FIG. 9F. In an example herein, the configuration change policy may be associated with 6 reward points (positive rewards) due to the reduction in the unresponsive state count (for example, 7) after selecting the configuration change policy for the gaming application. The notification policy may be associated with −7 reward points (negative rewards) due to an increase in the unresponsive state count after selecting the notification policy for the gaming application. The memory policy may be associated with −4 reward points (negative rewards), since the unresponsive state count did not decrease after applying the memory policy for the gaming application. Thus, the processor 110 may select the configuration change policy for the gaming application in order to reduce (e.g., avoid) the predicted unresponsive state.

Figure 10A:
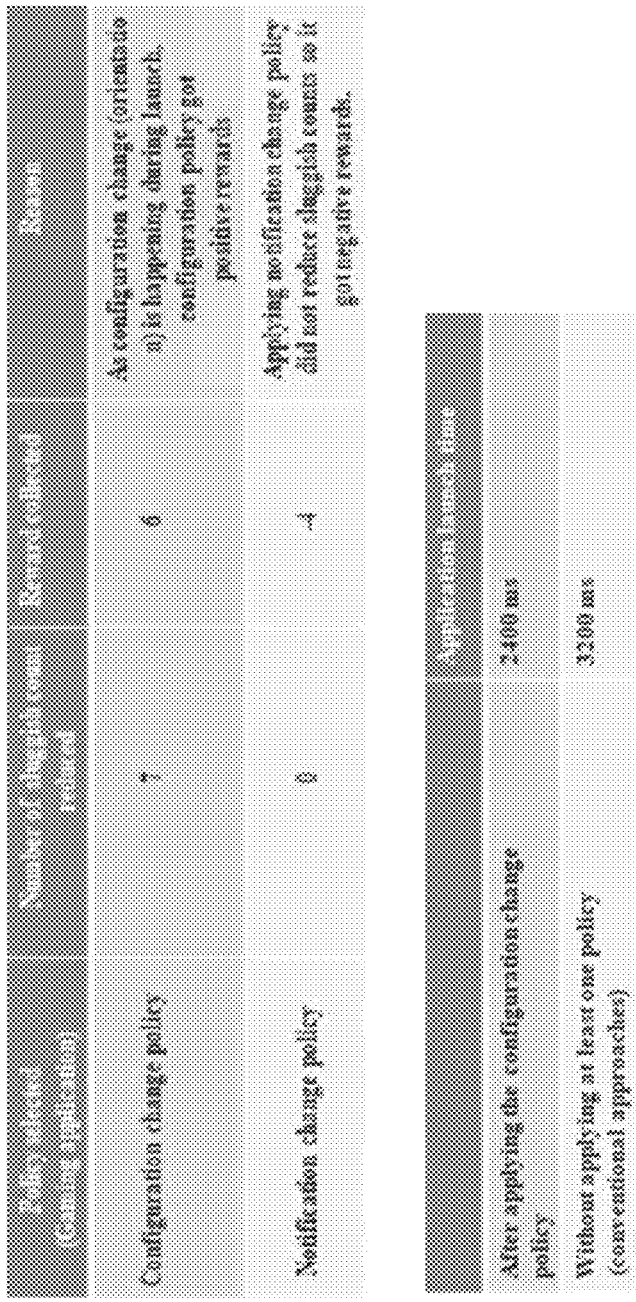
FIG. 10A is an example diagram illustrating selection of at least one policy for various kind of applications, according to an embodiment.

FIG. 10A is an example diagram illustrating selection of at least one policy for various kinds of applications, according to an embodiment. FIG. 10B is an example diagram illustrating selection of at least one policy for various kinds of applications, according to an embodiment. FIG. 10C is an example diagram illustrating selection of at least one policy for various kinds of applications, according to an embodiment.

By way of example where a user tries to launch a gaming application, the processor 110 predicts the source of an unresponsive state that may cause the launch time of the gaming application to exceed the pre-defined threshold. Thereafter, the processor 110 selects the at least one policy for reducing the launch time of the gaming application. The processor 110 may select the at least one policy based on the rewards associated with the policies that have been previously applied for improving the launch time of the gaming application.

In an example herein as illustrated in FIG. 10A, the configuration change policy and the notification policy are the policies that have been previously applied for improving the launch time of the gaming application. The configuration change policy may be associated with 6 positive reward points, since the configuration change policy improved the launch time of the application by reducing the unresponsive state count (for example, 7). The notification policy may be associated with −4 negative reward points, since the notification policy did not improve the launch time of the gaming application (did not reduce the unresponsive state count). Thus, the processor 110 may select the configuration change policy for improving the launch time of the gaming application. Here, after applying the at least one action of the selected policy on the operating condition of the at least one hardware module 106 and/or the at least one software module 108, the gaming application can be launched on the electronic device 100 in 2400 ms (as shown in FIG. 10A). Thus, for the user who always uses the gaming application, the configuration change policy may obtain the positive rewards.

According to another example where the user launches a social network application and wants to interact with the associated content, the processor 110 predicts the source of an unresponsive state that may cause the touch latency to exceed the pre-defined threshold. Thereafter, the processor 110 selects the at least one policy for reducing the touch latency. The processor 110 may select the policy based on the rewards associated with the policies that have been previously applied for improving the touch latency in response to the launch of the social networking application.

In an example herein as illustrated in FIG. 10B, the configuration change policy and the notification policy are the policies that have been previously applied for improving the touch latency in response to the launch of the social networking application. The configuration change policy may be associated with −5 negative reward points, since the configuration change policy did not improve the touch latency by reducing the unresponsive state count. The notification policy may be associated with 6 positive reward points, since the notification policy improved the touch latency by reducing the unresponsive state count (for example, 8). Here, after applying the at least one action of the selected policy on the operating condition of the at least one hardware module 106 and/or the at least one software module 108, the touch latency can be reduced to 700 ms (as shown in FIG. 10B). Thus, for the user who always uses the social networking application, the notification policy may obtain the positive rewards.

According to another example where the user launches a gaming application, the processor 110 predicts the source of an unresponsive state that may cause the frame drop. Thereafter, the processor 110 selects the at least one policy for reducing the frame drop. The processor 110 may select the policy based on the rewards associated with the policies that have been previously applied for improving the frame drop for the gaming application. In an example herein as illustrated in FIG. 10C, the configuration change policy, the notification policy and the memory policy are the policies that are previously selected for the gaming application to improve the frame drop. The configuration change policy may be associated with −5 negative reward points, since the configuration change policy did not improve the frame drop by reducing the unresponsive state count. The notification policy may be associated with −4 negative points, since the notification policy did not improve the frame drop by reducing the unresponsive state count reward points. The memory policy may be associated with 7 positive reward points, since the memory policy improved the frame drop by reducing the unresponsive state count (for example, 9). Thus, the processor 110 may select the memory policy for improving the frame drop in response to the launch of the social networking application. For example, after applying the memory policy, the frame drop can be reduced to 54 (as shown in FIG. 10C).

FIG. 11A is an example table illustrating a reduced launch time of various applications based on selecting a notification change policy for the various applications, according to an embodiment. Referring to FIG. 11A, the processor 110 may reduce the base launch time of each of the camera application, the gallery application, and the gaming application by applying the notification change policy to the device parameter associated with the unresponsive state of the electronic device. Thus, a user of the electronic device can experience a camera application, a gallery application, and a gaming application that start faster.

FIG. 11B is an example table illustrating a reduced launch time of the various applications based on selecting a configuration change policy for the various applications, according to an embodiment. Referring to FIG. 11B, the processor 110 may reduce the base launch time of each of Gaming application A, B, C, D, E, F and the camera application, by applying the Configuration change policy to the device parameter associated with the unresponsive state of the electronic device.

FIG. 11C is an example table illustrating a decreased camera rotation time based on selecting the configuration change policy, according to an embodiment. Referring to FIG. 11C, wherein the user uses a camera application for photo shoot, the processor 110 may predict a possible unresponsive state (for example, a delay in rotation of the electronic device 100 for capturing images). Further, the processor 110 may avoid the predicted unresponsive state by applying the configuration change policy on the operating conditions of the camera. Thus, the user's camera rotation experience can be improved.

Figure 11D:
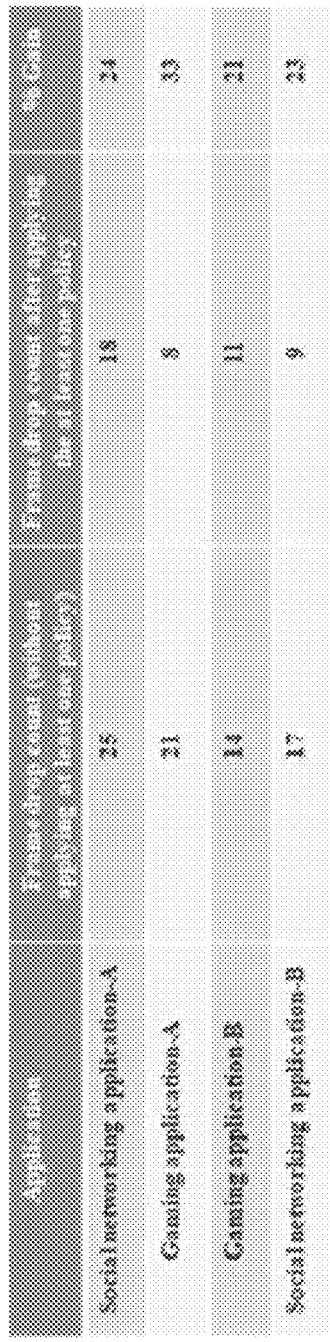
FIG. 11D is an example table illustrating a reduced frame drop count based on selecting at least one policy for various applications, according to an embodiment.

FIG. 11D is an example table illustrating a reduced frame drop count based on selecting at least one policy for the various applications, according to an embodiment. Referring to FIG. 11D, the processor 110 may reduce the frame drop count of each of Social networking application A, Gaming application A, Gaming application B, and Social networking application B, by applying the at least one of a plurality of policies associated with the unresponsive state of the electronic device 100.

Figure 11E:
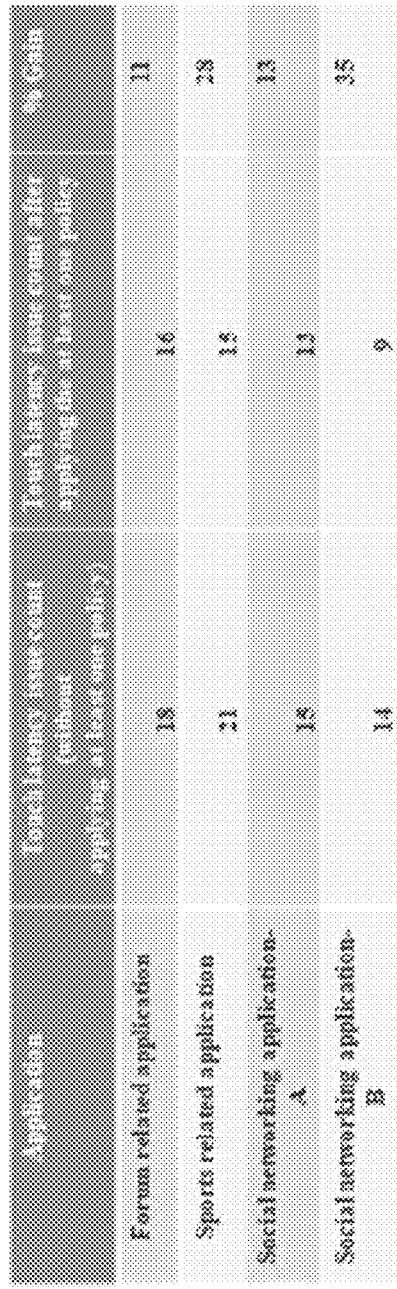
FIG. 11E is an example table illustrating reduced touch latency based on selecting at least one policy for various applications, according to an embodiment.

FIG. 11E is an example table illustrating a reduced touch latency based on selecting at least one policy for the various applications, according to an embodiment. Referring to FIG. 11E, the processor 110 may reduce the touch latency of each of Forum related application, Sports related application, Social networking application A, and Social networking application B, by applying the at least one of a plurality of policies associated with the unresponsive state of the electronic device.

Figure 12:
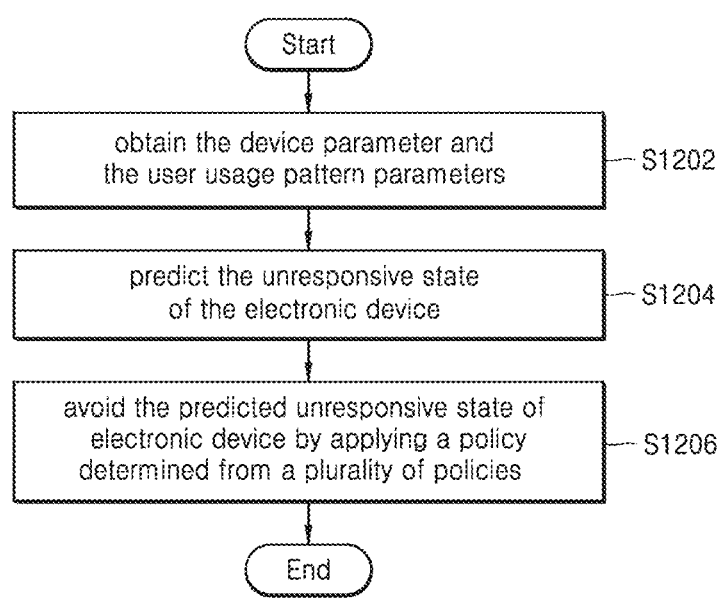
FIG. 12 is a flow diagram illustrating a method for controlling an unresponsive state of an electronic device, according to an embodiment.

FIG. 12 is a flow diagram illustrating a method for controlling an unresponsive state of an electronic device 100, according to an embodiment.

Referring to FIG. 12, in operation S1202, the processor 110 may collect (e.g., obtain) device parameters related to at least one of a hardware module 106 and a software module 108, and may collect the one or more user usage pattern parameters in response to (or based on) receiving at least one user input to the electronic device.

In operation S1204, the processor 110 may predict an unresponsive state of the electronic device 100 based on the collected device parameters and the user usage pattern parameter(s). The unresponsive state is a state of the electronic device in which at least one device parameter exceeds a pre-determined threshold. According to an embodiment, the responsive state may represent a state of the electronic device in which at least one device parameter of the electronic device is below a pre-determined threshold. For example, if the electronic device is operating in the responsive state, the electronic device may output a response to the user input within a predetermined time.

The processor may determine at least one parameter among the collected plurality of device parameters and the user usage pattern parameter(s) as at least one unresponsive state parameter based on a cause-effect relation between the plurality of device parameters and the user usage pattern parameter(s). Also, the processor may cluster the determined at least one unresponsive state parameter using a 4D clustering model and predict a source of the unresponsive state of the electronic device using the clustered at least one unresponsive state parameter.

According to an embodiment, the processor may generate a Direct Acyclic Graph (DAG) by performing a causal structure analysis (CSA) on the collected plurality of device parameters and user usage pattern parameters. The DAG may include a plurality of nodes representing at least one of the plurality of device parameters and the user usage pattern(s) and an unresponsive state node. The processor further may determine an unresponsive state node related to the unresponsive state of the electronic device using the cause-effect relation identified by analyzing the plurality of nodes of the DAG and at least one edge associated with the plurality of nodes of the DAG and determine a parameter represented by at least one node connected to the determined the unresponsive state node as the unresponsive state parameter.

Furthermore, the processor may determine a predetermined number of center points, classify the determined at least one unresponsive state parameter on a 4D map, based on the determined predetermined number of center points, and form at least one cluster in which the unresponsive state parameter is included, based on a pre-set average value of cluster for each the center point(s).

Moreover, the processor may predict the unresponsive state, based on the classification, by identifying the at least one unresponsive state parameter as the source of the unresponsive state. The at least one device parameter associated with the source of unresponsive state may exceed the pre-defined threshold.

For example, the processor may identify whether the formed at least one cluster is an unresponsive state cluster representing an unresponsive state condition, predict a responsive state of the electronic device based on not identifying that the clustered at least one unresponsive state parameter is classified as the unresponsive state cluster, and predict an unresponsive state of the electronic device based on identifying that the clustered at least one unresponsive state parameter is classified as the unresponsive state cluster.

In operation S1206, the processor 110 may reduce (e.g., avoid) the unresponsive state of the electronic device by selecting and applying a policy on the at least one device parameter that exceeds the pre-defined threshold. Once the device 100 has been determined as being in the unresponsive state, the processor 110 reduces the unresponsive state by configuring at least one policy/change policy.

For example, the processor may select a policy from among a plurality of policies associated with the predicted unresponsive state of the electronic device based on rewards previously set to each of the plurality of policies, select an action among a plurality of actions corresponding to the selected policy based on the user usage pattern parameter(s), and apply the selected action to the at least one device parameter that is associated with the predicted unresponsive state of the electronic device.

Furthermore, the processor 110 may assign the rewards to the selected policy based on the number of unresponsive state occurrences during a period of time (e.g., predetermined period of time) after applying the selected action to the at least one device parameter associated with the predicted unresponsive state of the electronic device.

Additionally, the processor 110 may further assign a positive reward to the selected policy based on a decrease in the number of unresponsive state occurrences during the period of the time, and assign a negative reward to the selected policy based on an increase in the number of unresponsive state occurrences during the period of the time. The processor may select the policy in a dynamic sequence to maximize rewards based on the user usage pattern parameter.

In other words, the processor 110 can apply the at least one policy to the at least one device parameter that is a cause for the unresponsive state (wherein the device parameter exceeds the pre-defined threshold), so that for a future user activity, the device parameters of at least one hardware module 106 and/or at least one software module 108 may not exceed the pre-defined threshold and the device 100 may not enter the unresponsive state due this specific parameter.

Embodiments disclosed herein can be implemented through at least one software program running on at least one hardware device and performing network management functions to control the elements. The elements shown in the figures can be at least one of a hardware device, software, or a combination of hardware device and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

The embodiments disclosed herein describe methods and apparatus for controlling an unresponsive state of an electronic device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in, e.g., Very high speed integrated circuit Hardware Description Language (VHDL), another programming language, or implemented by one or more VHDL or several software modules being executed on at least one hardware device. The hardware device can be any kind of portable device that can be programmed. The device may also include means which could be, e.g., hardware means like an ASIC, or a combination of hardware and software means, e.g., an ASIC and an FPGA, or at least one microprocessor and at least one memory located therein. Method embodiments described herein could be implemented partly in hardware and partly in software. Alternatively, embodiments may be implemented on different hardware devices, e.g., using a plurality of CPUs.

It is to be understood that the phraseology or terminology employed herein is for the purpose of description and not of limitation. Therefore, while the inventive concept(s) has been described in terms of embodiments, those skilled in the art will recognize that embodiments herein can be practiced with modification within the spirit and scope of the inventive concept(s) as described herein and in the appended claims.

What is claimed is:

1. A method for controlling an unresponsive state of an electronic device, the method comprising:
   obtaining, by a processor of the electronic device, a plurality of device parameters related to at least one of a hardware module of the electronic device and a software module of the electronic device, and a user usage pattern parameter based on receiving a user input to the electronic device;
   predicting, by the processor, the unresponsive state of the electronic device based on the obtained plurality of device parameters and the obtained user usage pattern parameter indicating a pattern of user inputs to the electronic device; and
   avoiding, by the processor, the predicted unresponsive state by applying, to a device parameter related to the predicted unresponsive state from among the plurality of device parameters, a policy determined from among a plurality of policies,
   wherein the pattern of user inputs comprises at least one of a notification access pattern, a configuration change pattern, or a unique pattern.

2. The method of claim 1, wherein the predicting comprises:
   determining an unresponsive state parameter, from among the obtained plurality of device parameters and the obtained user usage pattern parameter, based on a cause-effect relation between the plurality of device parameters and the user usage pattern parameter, wherein the unresponsive state parameter causes the unresponsive state;
   clustering the determined unresponsive state parameter using a four-dimensional (4D) clustering model; and
   predicting a source of the unresponsive state of the electronic device using the clustered unresponsive state parameter.

3. The method of claim 2, wherein the determining the unresponsive state parameter comprises:
   generating a Direct Acyclic Graph (DAG) by performing a causal structure analysis (CSA) on the obtained plurality of device parameters and the obtained user usage pattern parameter, wherein the DAG comprises a plurality of nodes representing an unresponsive state node and at least one of the plurality of device parameters and the user usage pattern parameter;
   determining the unresponsive state node related to the unresponsive state of the electronic device using the cause-effect relation identified by analyzing the plurality of nodes of the DAG and an edge associated with the plurality of nodes of the DAG; and determining a parameter represented by a node connected to the determined unresponsive state node as the unresponsive state parameter.

4. The method of claim 2, wherein the clustering the determined unresponsive state parameter comprises:
determining a predetermined number of center points;
classifying the determined unresponsive state parameter on a 4D map, based on the determined predetermined number of center points; and
forming a cluster in which the unresponsive state parameter is included, based on a pre-set mean value of cluster for each of the predetermined number of center points.

5. The method of claim 4, wherein the predicting the source of the unresponsive state of the electronic device comprises:
identifying whether the formed cluster is an unresponsive state cluster representing an unresponsive state condition;
predicting a responsive state of the electronic device based on not identifying that the clustered unresponsive state parameter is classified as the unresponsive state cluster; and
predicting the unresponsive state of the electronic device based on identifying that the clustered unresponsive state parameter is classified as the unresponsive state cluster.

6. The method of claim 1, wherein the avoiding, by the processor, the predicted unresponsive state comprises:
determining a policy, from among the plurality of policies associated with the predicted unresponsive state, based on rewards previously set to each of the plurality of policies;
determining, based on the user usage pattern parameter, an action among a plurality of actions corresponding to the determined policy; and
applying the determined action to the device parameter that is related to the predicted unresponsive state.

7. The method of claim 6, wherein:
the plurality of policies comprises at least one of a configuration change policy, a notification policy, and a memory policy; and
the device parameter related to the predicted unresponsive state is determined based on exceeding a pre-defined threshold.

8. The method of claim 6, further comprising assigning, by the processor, the rewards to the determined policy based on a number of unresponsive state occurrences during a predetermined period of time after applying the determined action to the device parameter related to the predicted unresponsive state.

9. The method of claim 8, wherein the assigning the rewards comprises:
assigning, by the processor, a positive reward to the determined policy based on a decrease in the number of unresponsive state occurrences during the predetermined period of the time; and
assigning, by the processor, a negative reward to the determined policy based on an increase in the number of unresponsive state occurrences during the predetermined period of the time.

10. The method of claim 9, wherein the determining the policy from among the plurality of policies associated with the predicted unresponsive state comprises selecting, by the processor, the policy in a dynamic sequence to maximize rewards based on the user usage pattern parameter.

11. An electronic device comprising:
a memory storing instructions; and
at least one processor configured to execute the instructions to:
obtain a plurality of device parameters related to at least one of a hardware module of the electronic device and a software module of the electronic device, and a user usage pattern parameter based on receiving a user input to the electronic device;
predict an unresponsive state of the electronic device based on the obtained plurality of device parameters and the obtained user usage pattern parameter indicating a pattern of user inputs to the electronic device; and
avoid the predicted unresponsive state by applying, to a device parameter related to the predicted unresponsive state from among the plurality of device parameters, a policy determined from among a plurality of policies,
wherein the pattern of user inputs comprises at least one of a notification access pattern, a configuration change pattern, or a unique pattern.

12. The electronic device of claim 11, wherein the at least one processor is further configured to execute the instructions to:
determine an unresponsive state parameter, from among the obtained plurality of device parameters and the obtained user usage pattern parameter, based on a cause-effect relation between the plurality of device parameters and the user usage pattern parameter, wherein the unresponsive state parameter causes the unresponsive state;
cluster the determined unresponsive state parameter using a 4D clustering model; and
predict a source of the unresponsive state of the electronic device using the clustered unresponsive state parameter.

13. The electronic device of claim 12, wherein the at least one processor is further configured to execute the instructions to:
generate a Direct Acyclic Graph (DAG) by performing a causal structure analysis (CSA) on the obtained plurality of device parameters and the obtained user usage pattern parameter, wherein the DAG comprises a plurality of nodes representing an unresponsive state node and at least one of the plurality of device parameters and the user usage pattern;
determine the unresponsive state node related to the unresponsive state of the electronic device using the cause-effect relation identified by analyzing the plurality of nodes of the DAG and an edge associated with the plurality of nodes of the DAG; and
determine a parameter represented by a connected to the determined the unresponsive state node as the unresponsive state parameter.

14. The electronic device of claim 12, wherein the at least one processor is further configured to execute the instructions to:
determine a predetermined number of center points;
classify the determined unresponsive state parameter on a 4D map, based on the determined predetermined number of center points; and
form a cluster in which the unresponsive state parameter is included, based on a pre-set average value of cluster for each of the predetermined number of center points.

15. The electronic device of claim 14, wherein the at least one processor is further configured to execute the instructions to:

identify whether the formed cluster is an unresponsive state cluster representing an unresponsive state condition;

predict a responsive state of the electronic device based on not identifying that the clustered unresponsive state parameter is classified as the unresponsive state cluster; and predict the unresponsive state of the electronic device based on identifying that the clustered unresponsive state parameter is classified as the unresponsive state cluster.

16. The electronic device of claim 11, wherein the at least one processor is further configured to execute the instructions to:

determine a policy, from among the plurality of policies associated with the predicted unresponsive state, based on rewards previously set to each of the plurality of policies;

determine, based on the user usage pattern parameter, an action among a plurality of actions corresponding to the determined policy; and apply the determined action to the device parameter that is related to the predicted unresponsive state.

17. The electronic device of claim 16, wherein:

the plurality of policies comprises at least one of a configuration change policy, a notification policy, and a memory policy; and the device parameter related to the predicted unresponsive state is determined based on exceeding a pre-defined threshold.

18. The electronic device of claim 16, wherein the at least one processor is further configured to execute the instructions to:

assign the rewards to the determined policy based on a number of unresponsive state occurrences during a predetermined period of time after applying the determined action to the device parameter related to the predicted unresponsive state.

19. The electronic device of claim 18, wherein the at least one processor is further configured to execute the instructions to:

assign a positive reward to the determined policy based on a decrease in the number of unresponsive state occurrences during the predetermined period of the time; and assign a negative reward to the determined policy based on an increase in the number of unresponsive state occurrences during the predetermined period of the time.

20. A non-transitory computer-readable recording medium having recorded thereon a program executable by at least one processor for performing the method of claim 1.

* * * * *